US012193977B2

United States Patent
Ito et al.

(10) Patent No.: US 12,193,977 B2
(45) Date of Patent: Jan. 14, 2025

(54) MOVING BODY AND CONTROL APPARATUS

(71) Applicant: Sony Group Corporation, Tokyo (JP)

(72) Inventors: Katsuhisa Ito, Tokyo (JP); Yuhei Yabe, Tokyo (JP); Takuya Nishibayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/549,922

(22) PCT Filed: Jan. 13, 2022

(86) PCT No.: PCT/JP2022/000902
§ 371 (c)(1),
(2) Date: Sep. 11, 2023

(87) PCT Pub. No.: WO2022/201762
PCT Pub. Date: Sep. 29, 2022

(65) Prior Publication Data
US 2024/0148575 A1    May 9, 2024

(30) Foreign Application Priority Data
Mar. 23, 2021   (JP) ................................ 2021-048901

(51) Int. Cl.
*A61G 5/04* (2013.01)
*A61G 5/08* (2006.01)
(Continued)

(52) U.S. Cl.
CPC ............. *A61G 5/04* (2013.01); *A61G 5/0858* (2016.11); *A61G 5/1075* (2013.01); *B62D 57/028* (2013.01)

(58) Field of Classification Search
CPC .... B62D 57/028; B62K 13/00; B62K 11/007; A61G 5/04; A61G 5/08; A61G 5/0858; A61G 5/1075
See application file for complete search history.

(56) References Cited

U.S. PATENT DOCUMENTS

| 5,975,225 A | * | 11/1999 | Kamen | .................. A61G 5/068 180/21 |
| 2002/0189870 A1 | * | 12/2002 | Kamen | ................ G05B 13/042 180/8.1 |

(Continued)

FOREIGN PATENT DOCUMENTS

| CN | 102730098 A | * | 10/2012 | |
| CN | 108327812 A | * | 7/2018 | .......... B62D 57/028 |

(Continued)

OTHER PUBLICATIONS

Chen, Electric Shopping Trolley Capable Of Seating On, Oct. 17, 2012, EPO, CN 102730098 A, Machine Translation of Description (Year: 2012).*

(Continued)

*Primary Examiner* — Paul N Dickson
*Assistant Examiner* — Matthew D Lee
(74) *Attorney, Agent, or Firm* — XSENSUS LLP

(57) ABSTRACT

To provide a moving body that is capable of more flexible movement.
Provided is a moving body including four or more legs that have wheels at ends thereof and are able to be controlled along two or more axes, and a body supported at the four or more legs, in which the four or more legs include two or more front wheel legs that are capable of swinging forward in an advancing direction of the body, and two or more rear wheel legs that are capable of swinging backward in the advancing direction of the body, and the front wheel legs and (Continued)

the rear wheel legs are capable of swinging to such positions that the wheels overlap one another in a direction orthogonal to the advancing direction.

20 Claims, 27 Drawing Sheets

(51) Int. Cl.
    *A61G 5/10*     (2006.01)
    *B62D 57/028*     (2006.01)

(56) References Cited

U.S. PATENT DOCUMENTS

| | | | | |
|---|---|---|---|---|
| 2012/0066846 | A1* | 3/2012 | Yu | B62D 57/024 |
| | | | | 180/8.2 |
| 2013/0226383 | A1 | 8/2013 | Kamen et al. | |
| 2019/0135551 | A1* | 5/2019 | Sekich | B65G 43/00 |
| 2019/0193798 | A1* | 6/2019 | Lu | B62D 57/032 |
| 2019/0302775 | A1* | 10/2019 | Palan | B62D 57/024 |
| 2020/0064841 | A1* | 2/2020 | Perrone | G05D 1/0088 |
| 2022/0192904 | A1* | 6/2022 | Syue | A61G 5/04 |

FOREIGN PATENT DOCUMENTS

| | | | | |
|---|---|---|---|---|
| CN | 116691869 A | * | 9/2023 | |
| JP | 2004-306733 A | | 11/2004 | |
| JP | 2006-187825 A | | 7/2006 | |
| JP | 2009-096335 A | | 5/2009 | |
| JP | 2018-030508 A | | 3/2018 | |
| WO | WO-2006112732 A1 | * | 10/2006 | A61G 5/04 |
| WO | WO-2007081452 A1 | * | 7/2007 | B60G 3/185 |

OTHER PUBLICATIONS

Li, A Multi-waking Mode Wheel-leg Robot, Jul. 27, 2018, EPO, CN 108327812 A, Machine Translation of Description (Year: 2018).*
International Search Report and Written Opinion mailed on Mar. 1, 2022, received for PCT Application PCT/JP2022/000902, filed on Jan. 13, 2022, 9 pages including English Translation.

* cited by examiner

MOVING BODY AND CONTROL APPARATUS

CROSS-RELATED TO RELATED APPLICATIONS

The present application is based on PCT filing PCT/JP2022/000902, filed Jan. 13, 2022, which claims priority from Japanese Patent Application No. 2021-048901, filed Mar. 23, 2021, the contents of each are incorporated herein by reference.

TECHNICAL FIELD

The present disclosure relates to a moving body and a control apparatus.

BACKGROUND ART

In recent years, with the progress of robotics-related technology, active research/development or productization of moving bodies in personally-ridden forms (what are generally called personal transporters) is being carried out. For example, PTL 1 described below discloses a personally-ridden moving body using a two-wheel inverted pendulum mechanism.

CITATION LIST

Patent Literature

PTL 1

U.S. Patent Application Publication No. 2013/226383

SUMMARY

Technical Problem

However, the moving body disclosed in PTL 1 has difficulty in moving at high speed due to characteristics of the two-wheel inverted pendulum mechanism. In addition, the moving body disclosed in PTL 1 sometimes faces difficulty in moving on an unpaved bad road or a bad road where there are steps, due to characteristics of the two-wheel inverted pendulum mechanism. Accordingly, moving bodies that can more flexibly cope with movement speeds or states of movement paths are demanded.

In view of this, the present disclosure proposes a novel and improved moving body that is capable of more flexible movement and a control apparatus therefor.

Solution to Problem

The present disclosure provides a moving body including four or more legs that have wheels at ends thereof and are able to be controlled along two or more axes, and a body supported at the four or more legs, in which the four or more legs include two or more front wheel legs that are capable of swinging forward in an advancing direction of the body, and two or more rear wheel legs that are capable of swinging backward in the advancing direction of the body, and the front wheel legs and the rear wheel legs are capable of swinging to such positions that the wheels overlap one another in a direction orthogonal to the advancing direction.

In addition, the present disclosure provides a control apparatus, in which the control apparatus controls a moving body including four or more legs that have wheels at ends thereof and are able to be controlled along two or more axes, and a body supported at the four or more legs, and the control apparatus swings two or more front wheel legs out of the four or more legs that are capable of swinging forward in an advancing direction of the body and two or more rear wheel legs out of the four or more legs that are capable of swinging backward in the advancing direction of the body to such positions that the wheels overlap one another in a direction orthogonal to the advancing direction.

According to the present disclosure, the moving body can transform into travel postures having different travel characteristics and different footprints by controlling the postures of the two or more front wheel legs and the two or more rear wheel legs.

DESCRIPTION OF EMBODIMENT

Hereinbelow, a suitable embodiment of the present disclosure is explained in detail with reference to the attached figures. Note that constituent elements that have substantially identical functional configurations are given identical reference signs in the present specification and figures, and overlapping explanations are thus omitted.

Note that the explanation is given in the following order.
1. Configuration of Moving Body
    1.1. Appearance Configuration
    1.2. Functional Configuration
2. Control of Moving Body
    2.1. Transformation Control
    2.2. Posture Control
    2.3. Movement Control
    2.4. Autonomous Control
3. Modification Examples
4. Notes

1. Configuration of Moving Body (1.1. Appearance Configuration)

Figure 1:
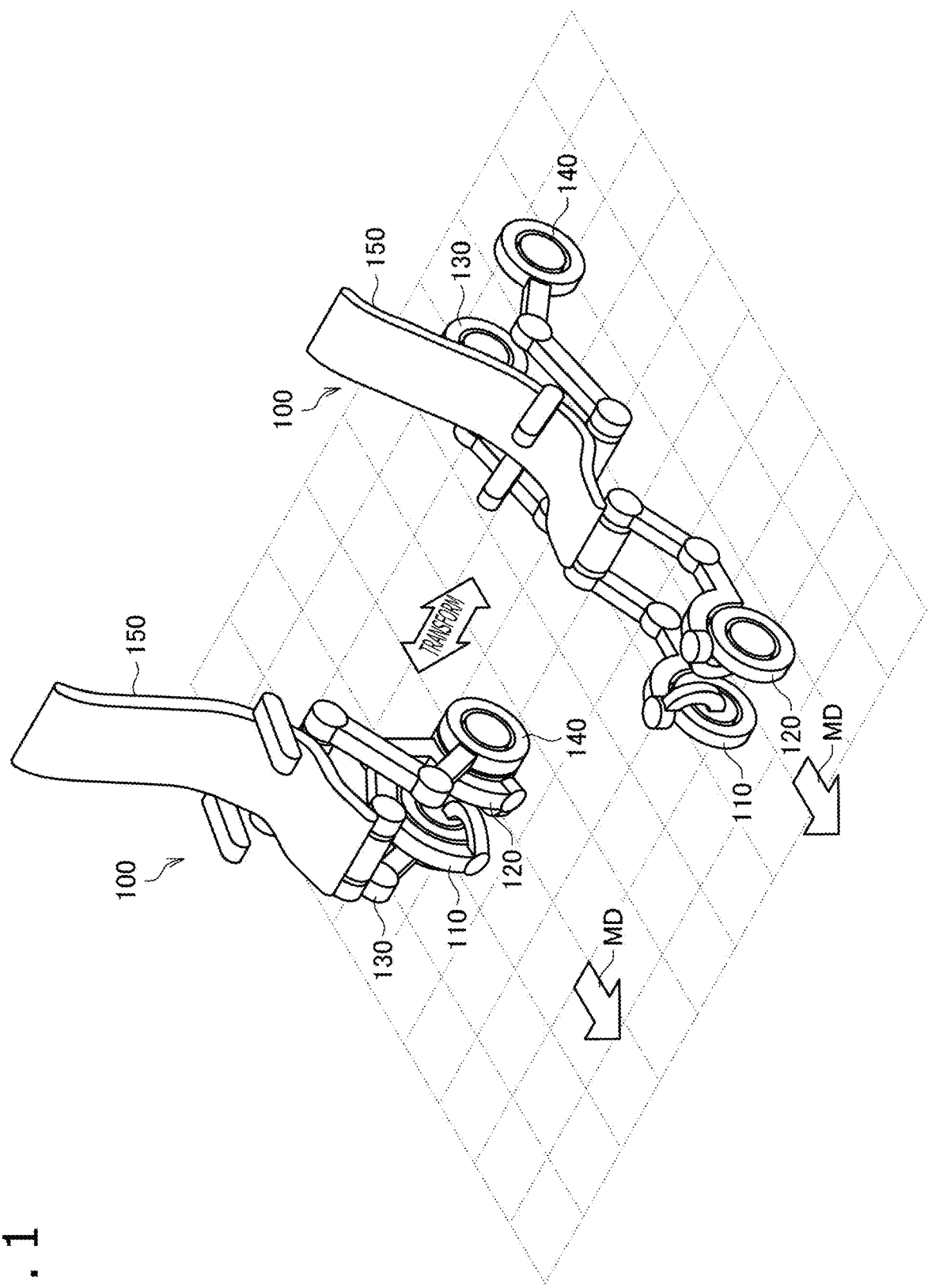
FIG. 1 is a perspective view for explaining an overview of a moving body according to one embodiment of the present disclosure.

First, an overview of a moving body 100 according to one embodiment of the present disclosure is explained with reference to FIG. 1. FIG. 1 is a perspective view for explaining an overview of the moving body 100 according to the present embodiment.

As depicted in FIG. 1, the moving body 100 according to the present embodiment includes a body 150, front wheel legs 110 and 120, and rear wheel legs 130 and 140. The moving body 100 according to the present embodiment is what is generally called a wheel-legged moving body.

Whereas the number of legs provided to the moving body 100 is explained as being four including two as the front wheel legs 110 and 120 and two as the rear wheel legs 130 and 140 in the present specification, the technology according to the present disclosure is not limited to the illustrated example. The number of legs provided to the moving body 100 is not limited to any particular number as long as it is equal to or greater than four to allow the body 150 to be supported stably. For example, the moving body 100 may include three front wheel legs and three rear wheel legs or may include four front wheel legs and four rear wheel legs.

The body 150 is a main part of the moving body 100, and is supported by the front wheel legs 110 and 120 and the rear wheel legs 130 and 140. For example, the body 150 includes a seat on which a user can ride, and a control apparatus that controls the overall action of the moving body 100 and a power source apparatus that supplies electric power to each section of the moving body 100 are mounted on the body 150.

The front wheel legs 110 and 120 are legs that have, at their ends, wheels to serve as ground-contacting points and can be controlled along two or more axes. The front wheel legs 110 and 120 are provided parallel to each other such that they extend from the body 150 forward in an advancing direction MD of the moving body 100. In addition, the front wheel legs 110 and 120 are provided to the body 150 in such a manner as to be swingable forward in the advancing direction MD of the moving body 100.

The rear wheel legs 130 and 140 are legs that have, at their ends, wheels to serve as ground-contacting points and can be controlled along two or more axes. The rear wheel legs 130 and 140 are provided parallel to each other such that they extend from the body 150 backward in the advancing direction MD of the moving body 100. In addition, the rear wheel legs 130 and 140 are provided to the body 150 such that they can swing backward in the advancing direction MD of the moving body 100.

In the moving body 100 according to the present embodiment, the front wheel legs 110 and 120 and the rear wheel legs 130 and 140 are provided such that they can swing to such positions that the wheels overlap one another in a direction orthogonal to the advancing direction MD.

As a result, as depicted on the left side of FIG. 1 as one faces FIG. 1, the moving body 100 can transform into a posture in which the wheels of the front wheel legs 110 and 120 and the wheels of the rear wheel legs 130 and 140 overlap in the direction orthogonal to the advancing direction MD by swinging the front wheel legs 110 and 120 and the rear wheel legs 130 and 140 toward below the body 150. In such a case, the moving body 100 can travel with a smaller footprint while maintaining a stabilized state by inverted pendulum control. In addition, by performing differential control of rotation of the left and right wheels, the moving body 100 can make a turn with a smaller rotation radius. Accordingly, the moving body 100 in such a posture can travel smoothly even through a narrow movement path.

In addition, as depicted on the right side of FIG. 1 as one faces FIG. 1, the moving body 100 can transform into a posture in which the front wheel legs 110 and 120 are stretched forward and the rear wheel legs 130 and 140 are stretched backward. In such a case, the moving body 100 can lengthen the wheelbase length by increasing the distance between the front wheel legs 110 and 120 and the rear wheel legs 130 and 140. Accordingly, the moving body 100 in such a posture can enhance the travel stability, thereby enabling stable travelling even at a time of high speed travelling.

That is, since the moving body 100 according to the present embodiment can dynamically switch into the two postures depicted in FIG. 1 by swinging the front wheel legs 110 and 120 and the rear wheel legs 130 and 140, the moving body 100 becomes capable of more flexible movement.

Figure 2:
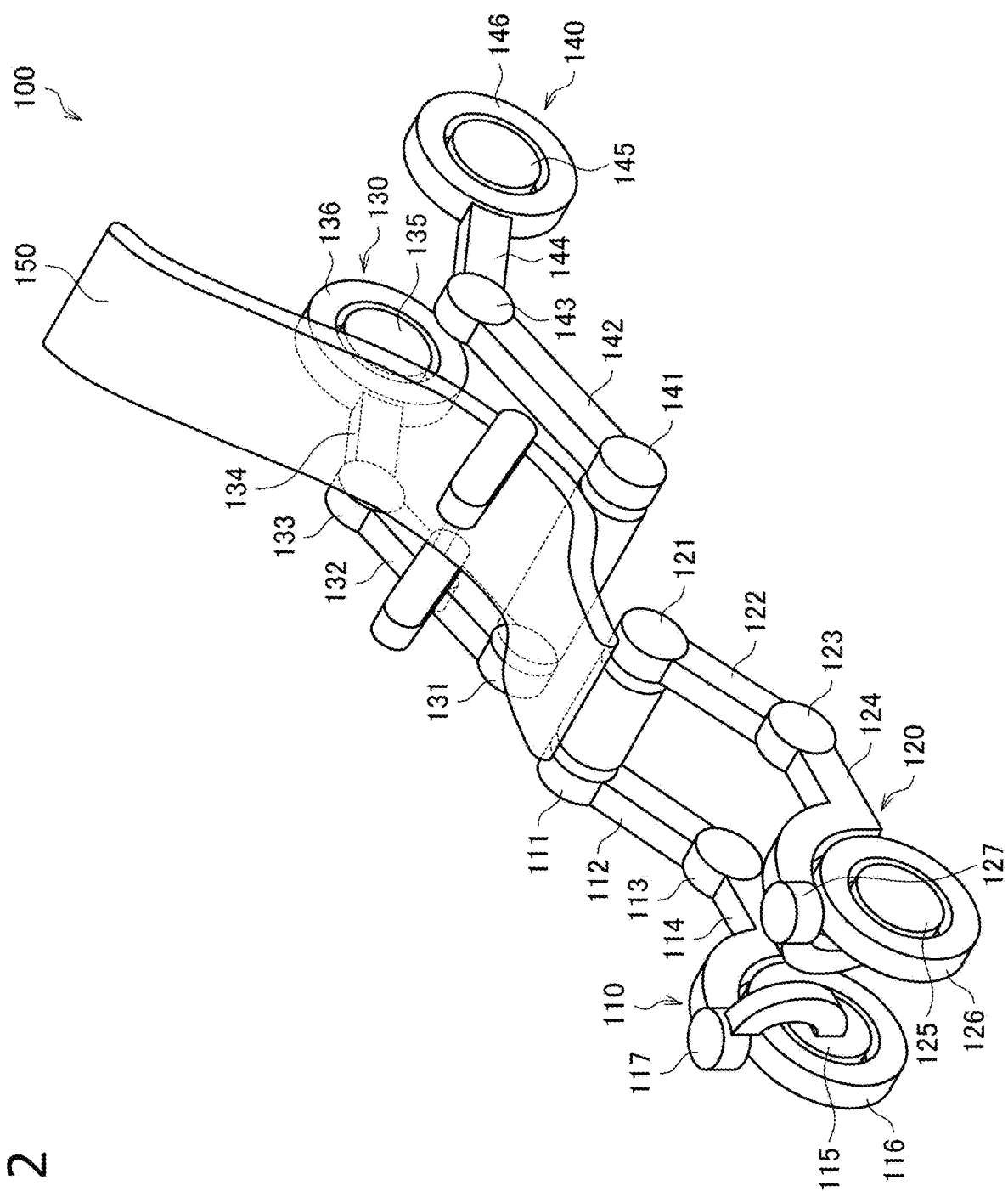
FIG. 2 is a perspective view depicting an appearance configuration of the moving body according to the embodiment.

Next, an appearance configuration of the moving body 100 according to one embodiment of the present disclosure is explained with reference to FIG. 2. FIG. 2 is a perspective view depicting the appearance configuration of the moving body 100 according to the present embodiment.

As depicted in FIG. 2, the moving body 100 includes the seat-shaped body 150, the front wheel legs 110 and 120 including link mechanisms, and the rear wheel legs 130 and 140 including link mechanisms.

(Body 150)

The body 150 is provided in a seat shape on which a user can ride. On the back of the seat-shaped seat surface of the body 150, the front wheel legs 110 and 120 are provided on the forward side in the advancing direction of the moving body 100, and the rear wheel legs 130 and 140 are provided on the backward side in the advancing direction of the moving body 100. For example, each of the front wheel legs 110 and 120 and the rear wheel legs 130 and 140 may be provided at a position corresponding to a vertex of the rectangular shape of the seat surface of the body 150. This allows the front wheel legs 110 and 120 and the rear wheel legs 130 and 140 to support the body 150 more stably.

(Front Wheel Leg 110)

The front wheel leg 110 includes a link mechanism having two joints, and includes a first joint 111, a first link 112, a second joint 113, a second link 114, a drive section 115, a wheel 116, and a steering section 117. The front wheel leg 110 can control the position of the wheel 116 along two axes coincident with the up-down direction and front-back direction relative to the advancing direction by using the first joint 111 and the second joint 113.

The first joint 111 connects the first link 112 to the body 150 such that the first link 112 becomes swingable along an axis orthogonal to the advancing direction of the moving body 100. The first link 112 includes a rigid structural member extending in one direction. One end portion of the first link 112 is swingably connected to the first joint 111, and the other end portion of the first link 112 is swingably connected to the second joint 113.

The second joint 113 connects the second link 114 to the first link 112 such that the second link 114 becomes swingable along an axis orthogonal to the advancing direction of the moving body 100. The second link 114 includes a rigid structural member extending curvedly in one direction. One end portion of the second link 114 is swingably connected to the second joint 113, and the other end portion of the second link 114 is connected with the wheel 116 via the steering section 117.

The wheel 116 is a ground-contacting portion of the front wheel leg 110, and is rotatably connected to the second link 114 via the steering section 117. The drive section 115 is a motor for controlling rotation of the wheel 116. For example, the drive section 115 may be what is generally called an in-wheel motor.

The steering section 117 is a movable section that makes the wheel 116 swingable along an axis perpendicular to the ground-contacting surface. The steering section 117 can control the travel direction of the moving body 100 by controlling the direction of the wheel 116 relative to the advancing direction of the moving body 100 in a posture in which the front wheel legs 110 and 120 are stretched forward and the rear wheel legs 130 and 140 are stretched backward.

(Front Wheel Leg 120)

The front wheel leg 120 includes a link mechanism having two joints, and includes a first joint 121, a first link 122, a second joint 123, a second link 124, a drive section 125, a wheel 126, and a steering section 127. The front wheel leg 120 can control the position of the wheel 126 along two axes coincident with the up-down direction and front-back direction relative to the advancing direction by using the first joint 121 and the second joint 123.

The first joint 121 connects the first link 122 to the body 150 such that the first link 122 becomes swingable along an axis orthogonal to the advancing direction of the moving body 100. The first link 122 includes a rigid structural member extending in one direction. One end portion of the second link 124 is swingably connected to the first joint 121, and the other end portion of the second link 124 is swingably connected to the second joint 123.

The second joint 123 connects the second link 124 to the first link 122 such that the second link 124 becomes swingable along an axis orthogonal to the advancing direction of the moving body 100. The second link 124 includes a rigid structural member extending curvedly in one direction. One end portion of the second link 124 is swingably connected to the second joint 123, and the other end portion of the second link 124 is connected with the wheel 126 via the steering section 127.

The wheel 126 is a ground-contacting portion of the front wheel leg 120, and is rotatably connected to the second link 124 via the steering section 127. The drive section 125 is a motor for controlling rotation of the wheel 126. For example, the drive section 125 may be what is generally called an in-wheel motor.

The steering section 127 is a movable section that makes the wheel 126 swingable along an axis perpendicular to the ground-contacting surface. The steering section 127 can control the travel direction of the moving body 100 by controlling the direction of the wheel 126 relative to the advancing direction of the moving body 100 in a posture in which the front wheel legs 110 and 120 are stretched forward and the rear wheel legs 130 and 140 are stretched backward.

(Rear Wheel Leg 130)

The rear wheel leg 130 includes a link mechanism having two joints, and includes a first joint 131, a first link 132, a second joint 133, a second link 134, a drive section 135, and a wheel 136. The rear wheel leg 130 can control the position of the wheel 136 along two axes coincident with the up-down direction and front-back direction relative to the advancing direction by using the first joint 131 and the second joint 133.

The first joint 131 connects the first link 132 to the body 150 such that the first link 132 becomes swingable along an axis orthogonal to the advancing direction of the moving body 100. The first link 132 includes a rigid structural member extending in one direction. One end portion of the first link 132 is swingably connected to the first joint 131, and the other end portion of the first link 132 is swingably connected to the second joint 133.

The second joint 133 connects the second link 134 to the first link 132 such that the second link 134 becomes swingable along an axis orthogonal to the advancing direction of the moving body 100. The second link 134 includes a rigid structural member extending in one direction. One end portion of the second link 134 is swingably connected to the second joint 133, and the other end portion of the second link 134 is connected with the wheel 136.

The wheel 136 is a ground-contacting portion of the rear wheel leg 130, and is rotatably connected to the second link 134. The drive section 135 is a motor for controlling rotation of the wheel 136. For example, the drive section 135 may be what is generally called an in-wheel motor.

(Rear Wheel Leg 140)

The rear wheel leg 140 includes a link mechanism having two joints, and includes a first joint 141, a first link 142, a second joint 143, a second link 144, a drive section 145, and a wheel 146. The rear wheel leg 140 can control the position of the wheel 146 along two axes coincident with the up-down direction and front-back direction relative to the advancing direction by using the first joint 141 and the second joint 143.

The first joint 141 connects the first link 142 to the body 150 such that the first link 142 becomes swingable along an axis orthogonal to the advancing direction of the moving body 100. The first link 142 includes a rigid structural member extending in one direction. One end portion of the first link 142 is swingably connected to the first joint 141, and the other end portion of the first link 142 is swingably connected to the second joint 143.

The second joint 143 connects the second link 144 to the first link 142 such that the second link 144 becomes swingable along an axis orthogonal to the advancing direction of the moving body 100. The second link 144 includes a rigid structural member extending in one direction. One end portion of the second link 144 is swingably connected to the second joint 143, and the other end portion of the second link 144 is connected with the wheel 146.

The wheel 146 is a ground-contacting portion of the rear wheel leg 140, and is rotatably connected to the second link 144. The drive section 145 is a motor for controlling rotation of the wheel 146. For example, the drive section 145 may be what is generally called an in-wheel motor.

Note that the front wheel legs 110 and 120 and the rear wheel legs 130 and 140 may include mechanisms other than those described above as long as the position of each of the wheels 116, 126, 136, and 146 can be controlled along two or more axes. For example, the front wheel legs 110 and 120 and the rear wheel legs 130 and 140 may include link mechanisms each including three or more joints and three or more links. In such a case, the front wheel legs 110 and 120 and the rear wheel legs 130 and 140 can control the position of each of the wheels 116, 126, 136, and 146 more precisely.

In addition, the steering sections 117 and 127 may be provided not to the front wheel legs 110 and 120 but to the rear wheel legs 130 and 140 or may be provided to both the front wheel legs 110 and 120 and the rear wheel legs 130 and 140.

(1.2. Functional Configuration)

Figure 3:
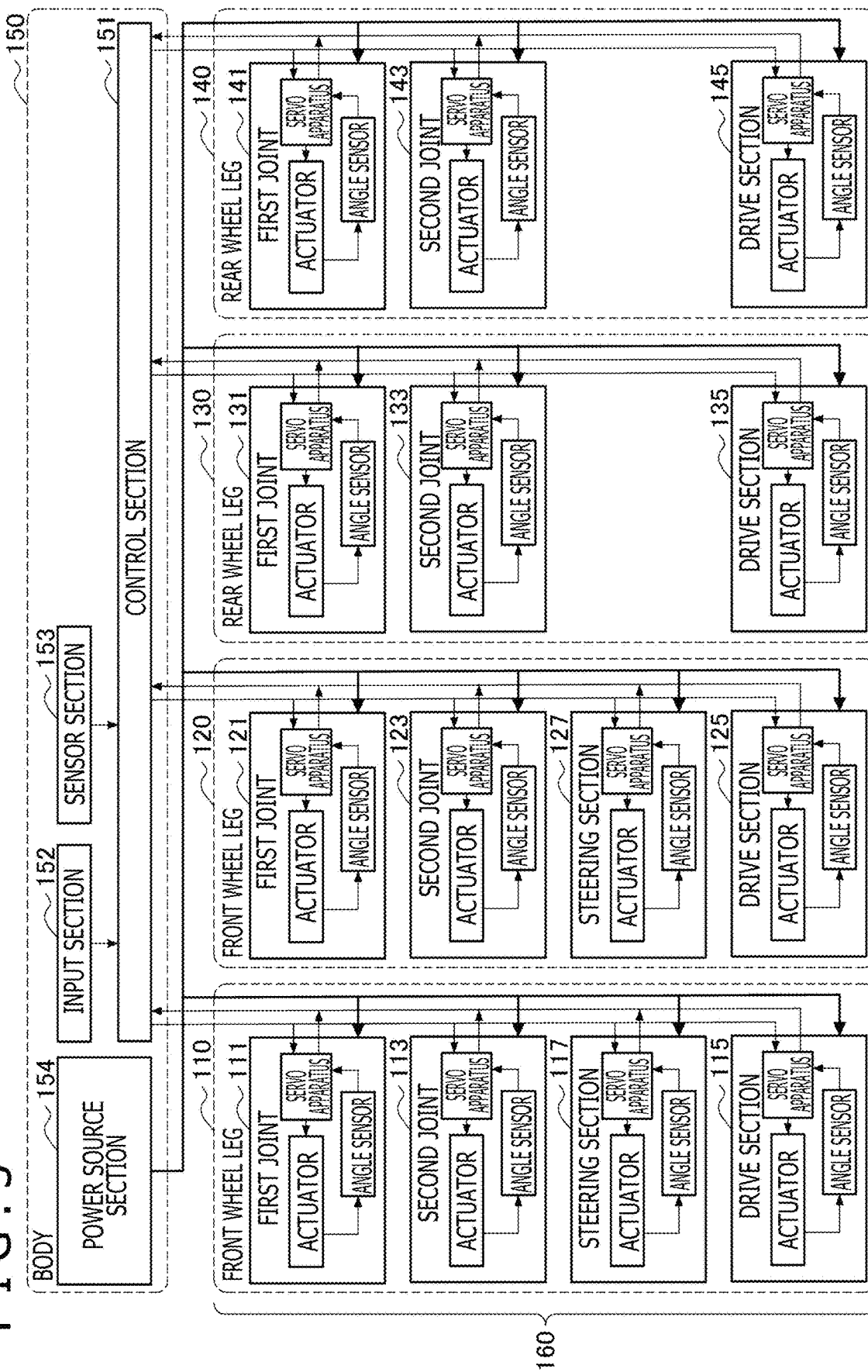
FIG. 3 is a block diagram depicting a functional configuration of the moving body according to the embodiment.

Next, the functional configuration of the moving body 100 according to the present embodiment is explained with reference to FIG. 3. FIG. 3 is a block diagram depicting the functional configuration of the moving body 100 according to the present embodiment.

As depicted in FIG. 3, the body 150 includes a control section 151, an input section 152, a sensor section 153, and a power source section 154.

The power source section 154 supplies electric power to each section of the moving body 100. For example, the power source section 154 may supply electric power for driving to an actuator provided to each of the front wheel legs 110 and 120 and the rear wheel legs 130 and 140. The power source section 154 may include a secondary battery such as a lithium ion secondary battery that can be charged by an external power source, may include a replaceable primary battery, or may include a generator that generates electric power by combusting a fuel or the like.

For example, the input section 152 is an interface such as a touch panel, a button, a switch, or a lever that accepts input from a user. The input section 152 may be a microphone or the like that acquires sounds made by a user or may be a receiver that receives remote operation instructions given from the outside via infrared rays or other radio waves.

The sensor section 153 includes various types of sensors, and acquires information for estimating the posture or position of the moving body 100 and information for recognizing an environment around the moving body 100.

For example, the sensor section 153 may include a triaxial gyro sensor or a triaxial acceleration sensor. For example, sensing results obtained by the triaxial gyro sensor or the triaxial acceleration sensor are used for estimating the posture of the moving body 100. In addition, the sensor section 153 may include a GNSS (Global Navigation Satellite System) sensor, an image sensor, or the like. For example, sensing results obtained by the GNSS sensor or the image sensor are used for estimating the position of the moving body 100. Furthermore, the sensor section 153 may include a spatial recognition sensor such as a stereo camera, a LiDAR (Light Detection And Ranging), or a ToF (Time of Flight) sensor. For example, sensing results obtained by the spatial recognition sensor are used for recognizing an environment around the moving body 100.

The control section 151 performs overall control of the posture and movement of the moving body 100 by controlling driving of the first joints 111, 121, 131, and 141, the second joints 113, 123, 133, and 143, the drive sections 115, 125, 135, and 145, and the steering sections 117 and 127 (hereinbelow, also referred to as a motor section 160 collectively) provided to the front wheel legs 110 and 120 and the rear wheel legs 130 and 140. For example, the control section 151 may control driving of the motor section 160 such that the moving body 100 assumes and is at a posture and a position that are input to the input section 152.

For example, the control section 151 includes a CPU (Central Processing Unit), a ROM (Read Only Memory), and a RAM (Random Access Memory). The CPU functions as a calculation processing apparatus, and can execute a temporarily loaded program by temporarily loading a program stored on the ROM onto the RAM.

The first joints 111, 121, 131, and 141, the second joints 113, 123, 133, and 143, the drive sections 115, 125, 135, and 145, and the steering sections 117 and 127 (the motor section 160 mentioned above) provided to the front wheel legs 110 and 120 and the rear wheel legs 130 and 140 are driven under the control by the control section 151.

Specifically, each section of the motor section 160 includes an actuator, a servo apparatus, and an angle sensor. The actuators rotation-drive the motor section 160. The angle sensors detect angles and angular velocities of the motor section 160. The servo apparatuses can control rotation of the motor section 160 by rotation-driving the motor section 160 at the actuators according to the angles and angular velocities of the motor section 160 detected by the angle sensors.

Note that the servo apparatus of each section of the motor section 160 and the control section 151 are connected with each other by a bidirectional serial bus. This allows the servo apparatus of each section of the motor section 160 to receive control commands from the control section 151 in real time. In addition, the servo apparatus of each section of the motor section 160 can output the state of the actuator detected by the angle sensor to the control section 151.

The configuration of the moving body 100 according to the present embodiment has been explained thus far. The moving body 100 according to the present embodiment can transform into postures having different travel characteristics by controlling the postures of the front wheel legs 110 and 120 and the rear wheel legs 130 and 140.

2. Control Of Moving Body (2.1. Transformation Control)

Figure 4:
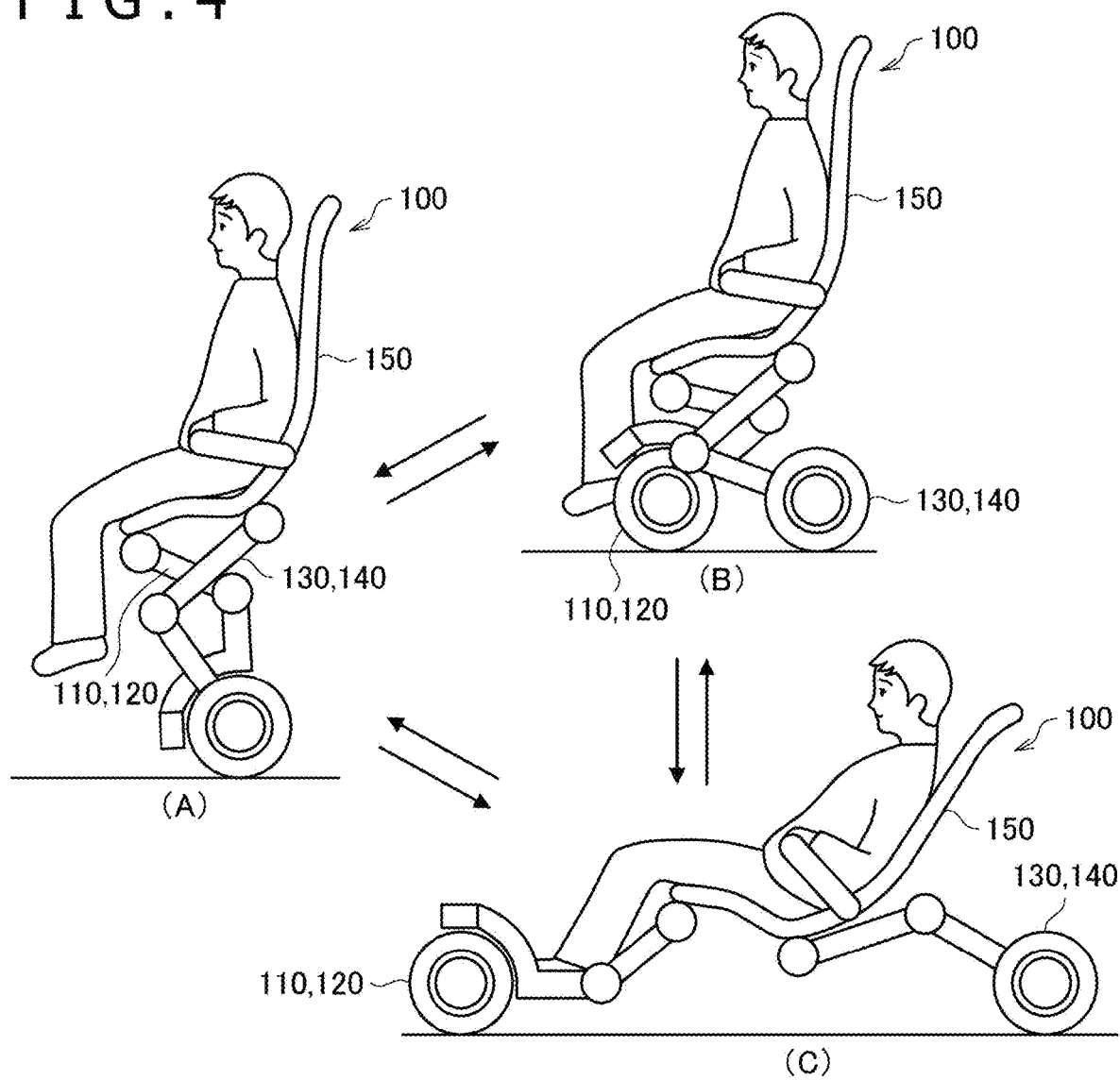
FIG. 4 is a schematic diagram for explaining transformations of the posture of the moving body according to the embodiment.

Next, transformation control of the posture of the moving body 100 according to the present embodiment is explained with reference to FIG. 4 to FIG. 13. FIG. 4 is a schematic diagram for explaining transformations of the posture of the moving body 100 according to the present embodiment.

As depicted in FIG. 4, the moving body 100 according to the present embodiment can transform into three postures by controlling the postures of the front wheel legs 110 and 120 and rear wheel legs 130 and 140. The three postures are a posture in an inverted pendulum travel mode depicted in (A), a posture in a stop mode depicted in (B), and a posture in a four-wheel travel mode depicted in (C).

Specifically, the inverted pendulum travel mode depicted in (A) is a mode in which the moving body 100 travels while maintaining its stabilized state by inverted pendulum control by causing the wheels of the front wheel legs 110 and 120 and rear wheel legs 130 and 140 to overlap one another in the direction orthogonal to the advancing direction. In the inverted pendulum travel mode, the posture of the moving body 100 can be controlled to be in the stabilized state by performing inverted pendulum control using the two wheels of the front wheel legs 110 and 120, inverted pendulum control using the two wheels of the rear wheel legs 130 and 140, or inverted pendulum control using the four wheels of the front wheel legs 110 and 120 and rear wheel legs 130 and 140. Note that, in the inverted pendulum travel mode, the advancing direction of the moving body 100 is controlled by differential control of the left and right wheels of the front wheel legs 110 and 120 and the left and right wheels of the rear wheel legs 130 and 140.

The stop mode depicted in (B) is a mode in which the body 150 is made stationary stably by controlling the wheels of the front wheel legs 110 and 120 and rear wheel legs 130 and 140 such that they are at positions with which the wheelbase length becomes approximately the same as the footprint of the body 150. In the stop mode, the posture of the body 150 can be stabilized like a stationary chair by controlling the four wheels of the front wheel legs 110 and 120 and rear wheel legs 130 and 140 such that they are at positions corresponding to the vertices of a rectangular shape.

The four-wheel travel mode depicted in (C) is a mode in which the moving body 100 travels while maintaining its stabilized state with the four wheels which are at distances from each other, by stretching the front wheel legs 110 and 120 forward and stretching the rear wheel legs 130 and 140 backward. In the four-wheel travel mode, the stability of the moving body 100 at a time of high speed travelling can be enhanced since the wheelbase length between the wheels of the front wheel legs 110 and 120 and the wheels of the rear wheel legs 130 and 140 becomes longer. Note that, in the four-wheel travel mode, the advancing direction of the moving body 100 is controlled by the steering sections 117 and 127 of the front wheel legs 110 and 120 and a speed difference between inner wheels and outer wheels in the wheels of the front wheel legs 110 and 120 and rear wheel legs 130 and 140.

Hereinbelow, transformation control of the moving body 100 at times of transitions between each pair of modes in the inverted pendulum travel mode, the stop mode, and the four-wheel travel mode that have been mentioned above is explained with reference to FIG. 5 to FIG. 13.

(Transitions between Inverted Pendulum Travel Mode and Stop Mode)

Figure 5:
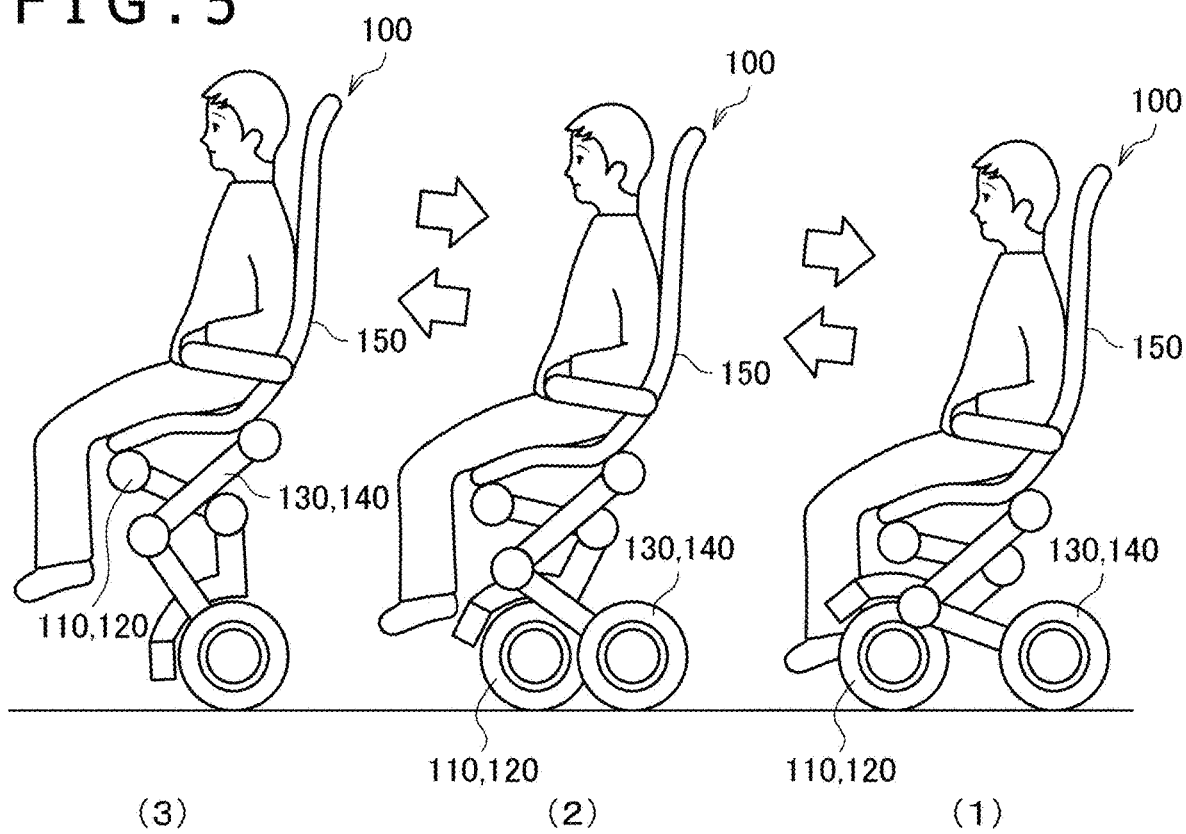
FIG. 5 is a schematic diagram depicting steps of transformations of the moving body between an inverted pendulum travel mode and a stop mode.
Figure 6:
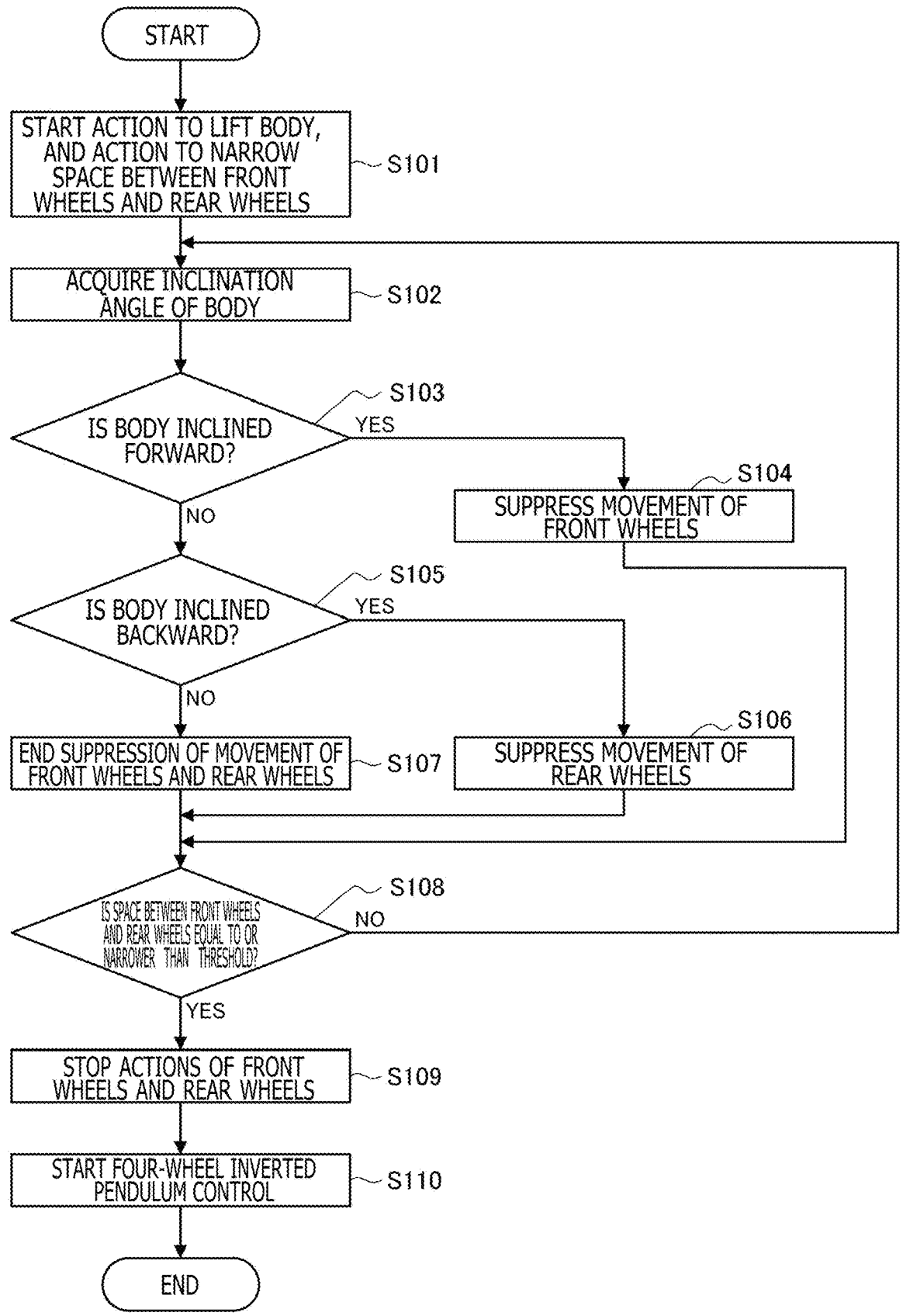
FIG. 6 is a flowchart diagram depicting a procedure of control of a transformation from a posture in the stop mode to a posture in the inverted pendulum travel mode.
Figure 7:
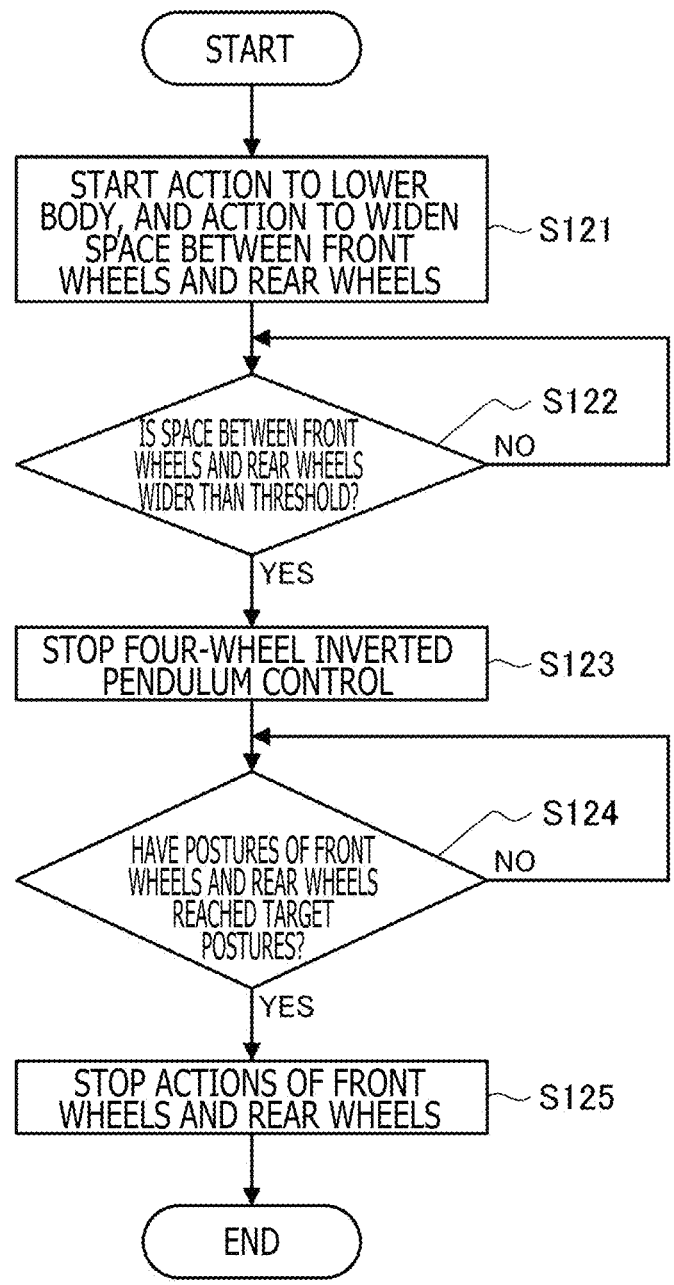
FIG. 7 is a flowchart diagram depicting a procedure of control of a transformation from the posture in the inverted pendulum travel mode to the posture in the stop mode.

FIG. 5 is a schematic diagram depicting steps of transformations of the moving body 100 between the inverted pendulum travel mode and the stop mode. FIG. 6 is a flowchart diagram depicting a procedure of control of a transformation from the posture in the stop mode to the posture in the inverted pendulum travel mode. FIG. 7 is a flowchart diagram depicting a procedure of control of a transformation from the posture in the inverted pendulum travel mode to the posture in the stop mode.

The procedure of control in a case where the moving body 100 transforms from the posture in the stop mode (the state of (1) in FIG. 5) to the posture in the inverted pendulum travel mode (the state of (3) in FIG. 5) is explained with reference to FIG. 5 and FIG. 6.

As depicted in FIG. 6, first, the moving body 100 starts execution of an action to lift the body 150 and an action to narrow the space between the wheels of the front wheel legs 110 and 120 and the wheels of the rear wheel legs 130 and 140 (S101). As a result, the moving body 100 transitions to the state of (2) in FIG. 5. Next, at a predetermined timing, the moving body 100 acquires the inclination angle of the body 150 in the advancing direction by a gyro sensor (S102).

Next, the moving body 100 determines from the acquired inclination angle whether or not the body 150 is inclined forward in the advancing direction (S103). In a case where the body 150 is inclined forward in the advancing direction (S103/Yes), the moving body 100 suppresses movement of the wheels of the front wheel legs 110 and 120 (S104). Specifically, the moving body 100 reduces the movement speeds of the wheels of the front wheel legs 110 and 120.

In a case where the body 150 is not inclined forward in the advancing direction (S103/No), the moving body 100 determines from the acquired inclination angle whether or not the body 150 is inclined backward in the advancing direction (S105). In a case where the body 150 is inclined backward in the advancing direction (S105/Yes), the moving body 100 suppresses movement of the wheels of the rear wheel legs 130 and 140 (S106). Specifically, the moving body 100 reduces the movement speeds of the wheels of the rear wheel legs 130 and 140.

In a case where the body 150 is not inclined backward in the advancing direction (S105/No), the moving body 100 ends the suppression of the movement of the wheels of the front wheel legs 110 and 120 started in Step S104 before the loop and the suppression of the movement of the wheels of the rear wheel legs 130 and 140 started in Step S106 before the loop (S107). Specifically, the moving body 100 brings the movement speeds of the wheels of the front wheel legs 110 and 120 and rear wheel legs 130 and 140 back to the movement speeds at a time of Step S101.

Note that the determinations in Step S103 and Step S105 described above may be performed in the order as described above, i.e., the determination in Step S105 is performed after the determination in Step S103, or may be performed in the reversed order, i.e., the determination in Step S103 is performed after the determination in Step S103. In addition, the determinations in Step S103 and Step S105 may be performed concurrently.

Next, after Step S104, Step S106, or Step S107, the moving body 100 determines whether or not the space between the wheels of the front wheel legs 110 and 120 and the wheels of the rear wheel legs 130 and 140 is equal to or narrower than a threshold (S108). The threshold used at this time is such a threshold of the space between the wheels of the front wheel legs 110 and 120 and the wheels of the rear wheel legs 130 and 140 that four-wheel inverted pendulum control can be performed with the wheels of the front wheel legs 110 and 120 and the wheels of the rear wheel legs 130 and 140.

In a case where the space between the wheels of the front wheel legs 110 and 120 and the wheels of the rear wheel legs 130 and 140 is equal to or narrower than the threshold (S108/Yes), the moving body 100 stops the actions of the front wheel legs 110 and 120 and rear wheel legs 130 and 140 of Step S101 (S109). As a result, the moving body 100 can start the four-wheel inverted pendulum control since the moving body 100 can transform into the posture in the inverted pendulum travel mode (S110).

On the other hand, in a case where the space between the wheels of the front wheel legs 110 and 120 and the wheels of the rear wheel legs 130 and 140 is wider than the threshold (S108/No), the moving body 100 continues movement of the wheels of the front wheel legs 110 and 120 and the wheels of the rear wheel legs 130 and 140, and returns to Step S102 to acquire the inclination angle of the body 150 again.

According to the actions mentioned above, the moving body 100 can move the wheels of the front wheel legs 110 and 120 and the wheels of the rear wheel legs 130 and 140 to such positions that the body 150 is balanced as an inverted pendulum without being inclined almost at all. As a result, the moving body 100 can find such positions of the wheels that the body 150 is balanced, each time, depending on the position of the center of mass that changes depending on the physique and posture of a riding user.

Note that, instead of the inclination angle of the body 150, the moving body 100 may use balance changes of a load that is applied to each of the wheels of the front wheel legs 110 and 120 and the wheels of the rear wheel legs 130 and 140. Even in such a case, the moving body 100 can control the movement of the wheels of the front wheel legs 110 and 120 and the wheels of the rear wheel legs 130 and 140 as described above.

The procedure of control in a case where the moving body 100 transforms from the posture in the inverted pendulum travel mode (the state of (3) in FIG. 5) to the posture in the stop mode (the state of (1) in FIG. 5) is explained with reference to FIG. 5 and FIG. 7.

As depicted in FIG. 7, first, the moving body 100 starts execution of an action to lower the body 150 and an action to widen the space between the wheels of the front wheel legs 110 and 120 and the wheels of the rear wheel legs 130 and 140 (S121). As a result, the moving body 100 transitions to the state of (2) in FIG. 5.

Next, the moving body 100 determines whether or not the space between the wheels of the front wheel legs 110 and 120 and the wheels of the rear wheel legs 130 and 140 is wider than a threshold (S122). The threshold used at this time is such a threshold of the space between the wheels of the front wheel legs 110 and 120 and the wheels of the rear wheel legs 130 and 140 that the four-wheel inverted pendulum control can be performed with the wheels of the front wheel legs 110 and 120 and the wheels of the rear wheel legs 130 and 140.

In a case where the space between the wheels of the front wheel legs 110 and 120 and the wheels of the rear wheel legs 130 and 140 is equal to or narrower than the threshold (S122/No), the moving body 100 continues movement of the wheels of the front wheel legs 110 and 120 and the wheels of the rear wheel legs 130 and 140, and returns to Step S122 to perform the determination again. On the other hand, in a case where the space between the wheels of the front wheel legs 110 and 120 and the wheels of the rear wheel legs 130 and 140 is wider than the threshold (S122/Yes), the moving body 100 stops the four-wheel inverted pendulum control (S123).

Next, the moving body 100 determines whether or not the postures of the front wheel legs 110 and 120 and rear wheel legs 130 and 140 have reached target postures of the stop mode (S124). In a case where the postures of the front wheel legs 110 and 120 and rear wheel legs 130 and 140 have not reached the target postures of the stop mode (S124/No), the moving body 100 continues movement of the wheels of the front wheel legs 110 and 120 and the wheels of the rear wheel legs 130 and 140, and returns to Step S124 to perform the determination again.

On the other hand, in a case where the postures of the front wheel legs 110 and 120 and rear wheel legs 130 and 140 have reached the target postures of the stop mode (S124/Yes), the moving body 100 stops the actions of the front wheel legs 110 and 120 and rear wheel legs 130 and 140 of Step S121 (S125). As a result, the moving body 100 can transition to the stop mode.

According to the actions mentioned above, the moving body 100 can transform from the posture in the inverted pendulum travel mode in which the body 150 is controlled as a four-wheel inverted pendulum to the posture in the stop mode in which the body 150 is made stationary stably.

(Transition between Inverted Pendulum Travel Mode and Four-Wheel Travel Mode)

Figure 8:
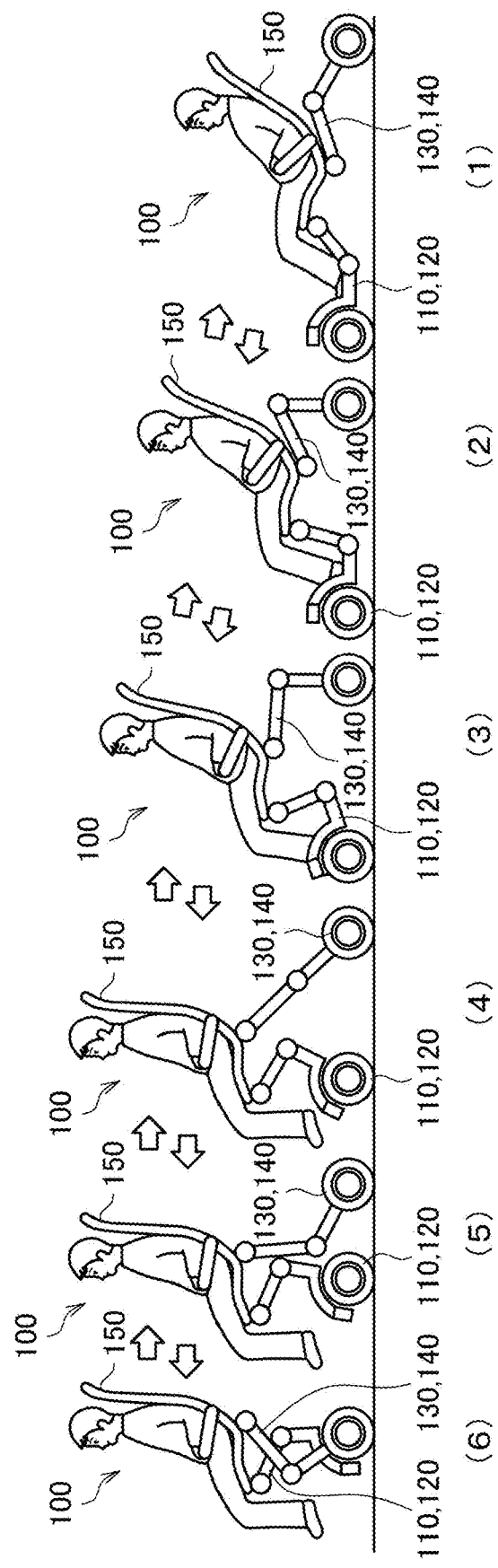
FIG. 8 is a schematic diagram depicting steps of transformations between the inverted pendulum travel mode and a four-wheel travel mode.
Figure 9:
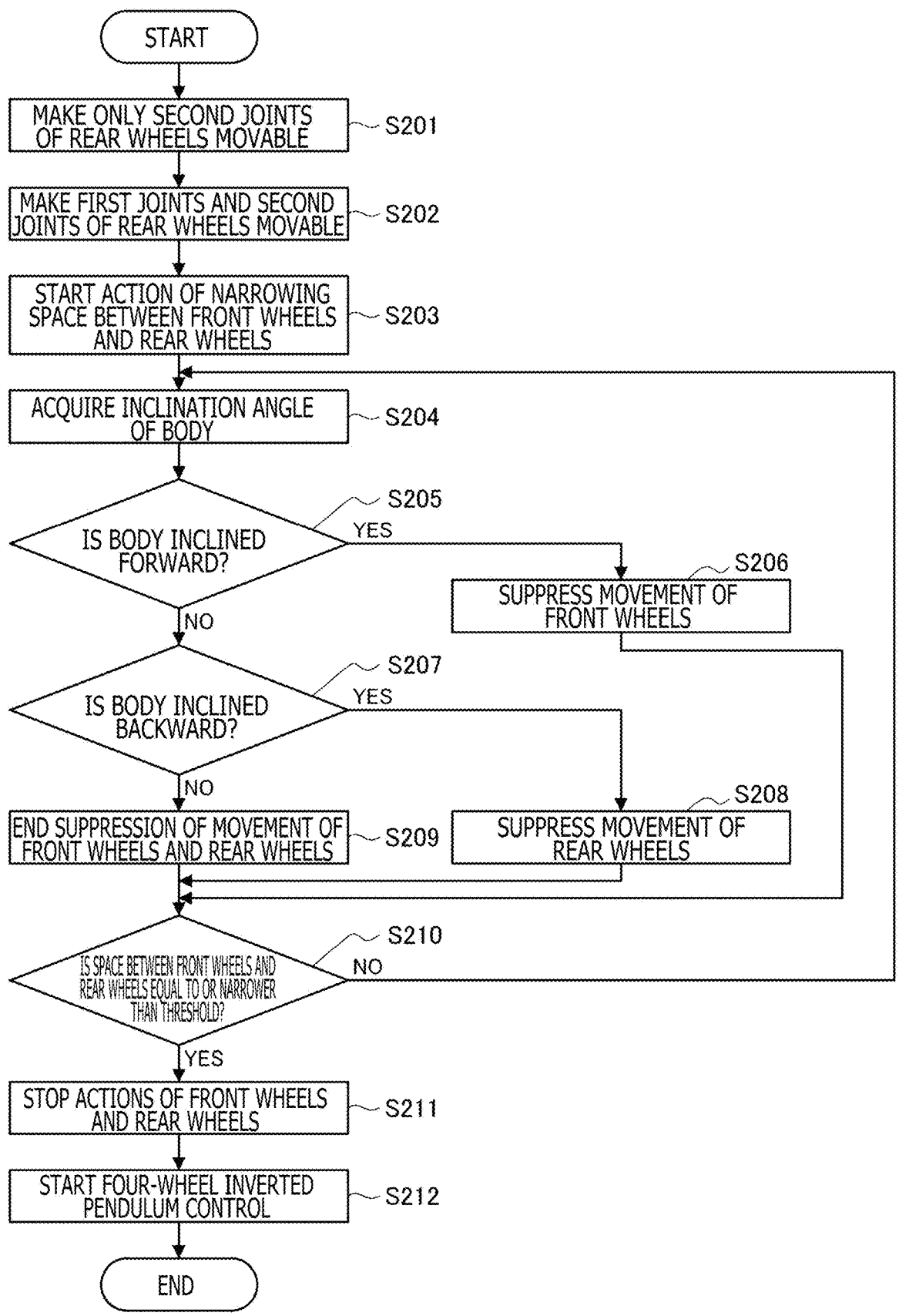
FIG. 9 is a flowchart diagram depicting a procedure of control of a transformation from a posture in the four-wheel travel mode to the posture in the inverted pendulum travel mode.
Figure 10:
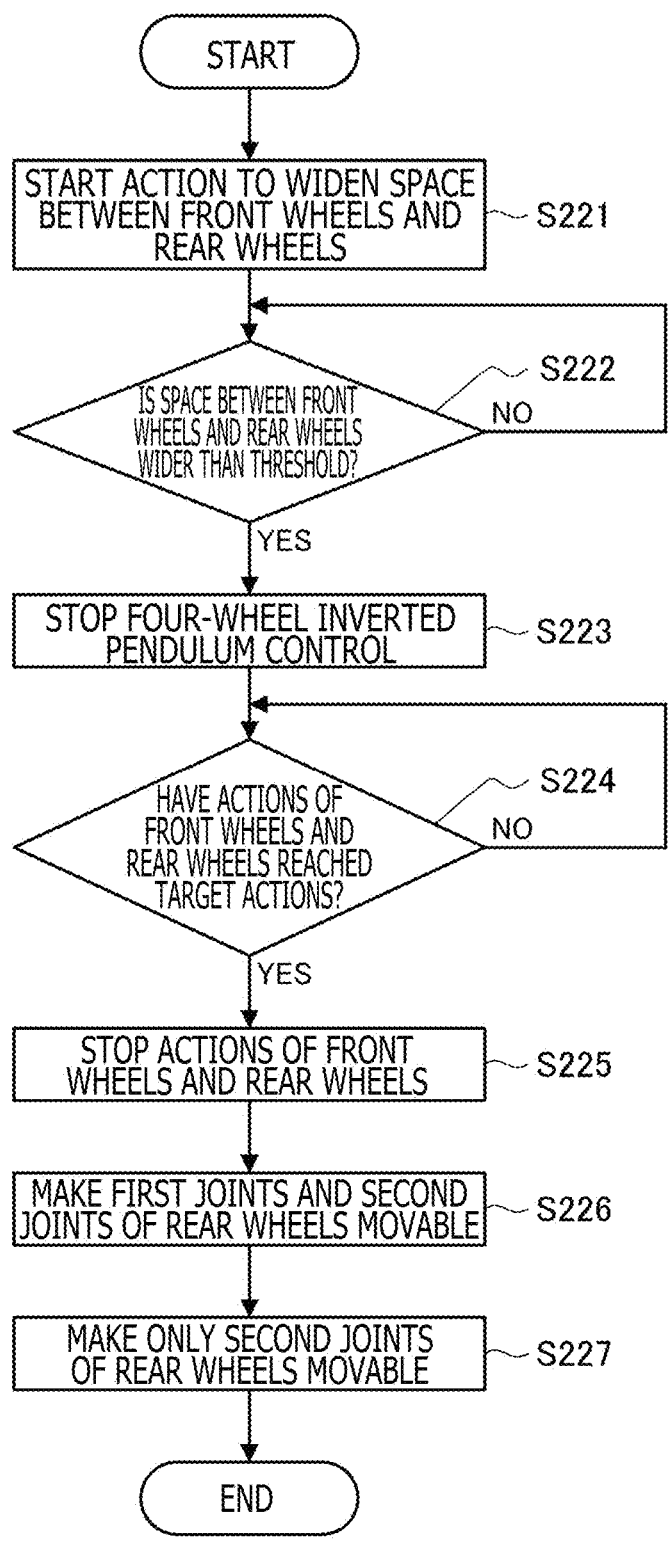
FIG. 10 is a flowchart diagram depicting a procedure of control of a transformation from the posture in the inverted pendulum travel mode to the posture in the four-wheel travel mode.

FIG. 8 is a schematic diagram depicting steps of transformations between the inverted pendulum travel mode and the four-wheel travel mode. FIG. 9 is a flowchart diagram depicting a procedure of control of a transformation from the posture in the four-wheel travel mode to the posture in the inverted pendulum travel mode. FIG. 10 is a flowchart diagram depicting a procedure of control of a transformation from the posture in the inverted pendulum travel mode to the posture in the four-wheel travel mode.

The procedure of control in a case where the moving body 100 transforms from the posture in the four-wheel travel mode (the state of (1) in FIG. 8) to the posture in the inverted pendulum travel mode (the state of (6) in FIG. 8) is explained with reference to FIG. 8 and FIG. 9.

As depicted in FIG. 9, first, the moving body 100 makes only the second joints 133 and 143 movable while keeping the first joints 131 and 141 of the rear wheel legs 130 and 140 unmovable (S201). As a result, the moving body 100 transitions to the state of (2) in FIG. 8 where the second links 134 and 144 of the rear wheel legs 130 and 140 become perpendicular to the ground-contacting surface.

Next, the moving body 100 makes the first joints 131 and 141 and second joints 133 and 143 of the rear wheel legs 130 and 140 movable (S202). As a result, the moving body 100 transitions to the state of (3) in FIG. 8 where the first links 132 and 142 and second links 134 and 144 of the rear wheel legs 130 and 140 are at right angles, and thereafter transitions to the state of (4) in FIG. 8 where the first links 132 and 142 and second links 134 and 144 of the rear wheel legs 130 and 140 are aligned on a straight line.

By actuating the rear wheel legs 130 and 140 stepwise in such a manner, the moving body 100 can reduce loads applied onto the first joints 131 and 141 of the rear wheel legs 130 and 140. Accordingly, the moving body 100 can reduce the possibility of malfunctioning caused by concentration of loads.

Thereafter, the moving body 100 starts execution of an action to narrow the space between the wheels of the front wheel legs 110 and 120 and the wheels of the rear wheel legs 130 and 140 (S203). As a result, the moving body 100 transitions to the state of (5) in FIG. 8. Next, at a predetermined timing, the moving body 100 acquires the inclination angle of the body 150 in the advancing direction by a gyro sensor (S204).

Then, the moving body 100 determines from the acquired inclination angle whether or not the body 150 is inclined forward in the advancing direction (S205). In a case where the body 150 is inclined forward in the advancing direction (S205/Yes), the moving body 100 suppresses movement of the wheels of the front wheel legs 110 and 120 (S206). Specifically, the moving body 100 reduces the movement speeds of the wheels of the front wheel legs 110 and 120.

In a case where the body 150 is not inclined forward in the advancing direction (S205/No), the moving body 100 determines from the acquired inclination angle whether or not the body 150 is inclined backward in the advancing direction (S207). In a case where the body 150 is inclined backward in the advancing direction (S207/Yes), the moving body 100 suppresses movement of the wheels of the rear wheel legs 130 and 140 (S208). Specifically, the moving body 100 reduces the movement speeds of the wheels of the rear wheel legs 130 and 140.

In a case where the body 150 is not inclined backward in the advancing direction (S207/No), the moving body 100 ends the suppression of the movement of the wheels of the front wheel legs 110 and 120 started in Step S206 before the loop and the suppression of the movement of the wheels of the rear wheel legs 130 and 140 started in Step S208 before the loop (S209). Specifically, the moving body 100 brings the movement speeds of the wheels of the front wheel legs 110 and 120 and rear wheel legs 130 and 140 back to movement speeds at a time of Step S203.

Note that the determinations in Step S205 and Step S207 described above may be performed in this order as described above, i.e., the determination in step S207 is performed after the determination in step S205, or may be performed in the reversed order, i.e., the determination in step S205 is performed after the determination in step S207. In addition, the determinations in Step S205 and Step S207 may be performed concurrently.

Next, after Step S206, Step S208, or Step S209, the moving body 100 determines whether or not the space between the wheels of the front wheel legs 110 and 120 and the wheels of the rear wheel legs 130 and 140 is equal to or narrower than a threshold (S210). The threshold used at this time is such a threshold of the space between the wheels of the front wheel legs 110 and 120 and the wheels of the rear wheel legs 130 and 140 that the four-wheel inverted pendulum control can be performed with the wheels of the front wheel legs 110 and 120 and the wheels of the rear wheel legs 130 and 140.

In a case where the space between the wheels of the front wheel legs 110 and 120 and the wheels of the rear wheel legs 130 and 140 is equal to or narrower than the threshold (S210/Yes), the moving body 100 stops the actions of the front wheel legs 110 and 120 and the rear wheel legs 130 and 140 of Step S203 (S211). As a result, the moving body 100 can start the four-wheel inverted pendulum control since the moving body 100 can transform into the posture in the inverted pendulum travel mode (S212).

On the other hand, in a case where the space between the wheels of the front wheel legs 110 and 120 and the wheels of the rear wheel legs 130 and 140 is wider than the threshold (S210/No), the moving body 100 continues movement of the wheels of the front wheel legs 110 and 120 and the wheels of the rear wheel legs 130 and 140, and returns to Step S204 to acquire the inclination angle of the body 150 again.

According to the actions described above, the moving body 100 can move the wheels of the front wheel legs 110 and 120 and the wheels of the rear wheel legs 130 and 140 to such positions that the body 150 is balanced as an inverted pendulum without being inclined almost at all. As a result, the moving body 100 can find such positions of the wheels that the body 150 is balanced at each time depending on the position of the center of mass that changes depending on the physique and posture of a riding user.

The procedure of control in a case where the moving body 100 transforms from the posture in the inverted pendulum travel mode (the state of (6) in FIG. 8) to the posture in the four-wheel travel mode (the state of (1) in FIG. 8) is explained with reference to FIG. 8 and FIG. 10.

As depicted in FIG. 10, first, the moving body 100 starts execution of an action to widen the space between the wheels of the front wheel legs 110 and 120 and the wheels of the rear wheel legs 130 and 140 (S221). As a result, the moving body 100 transitions to the state of (5) in FIG. 8.

Next, the moving body 100 determines whether or not the space between the wheels of the front wheel legs 110 and 120 and the wheels of the rear wheel legs 130 and 140 is wider than a threshold (S222). The threshold used at this time is such a threshold of the space between the wheels of the front wheel legs 110 and 120 and the wheels of the rear wheel legs 130 and 140 that the four-wheel inverted pendulum control can be performed with the wheels of the front wheel legs 110 and 120 and the wheels of the rear wheel legs 130 and 140.

In a case where the space between the wheels of the front wheel legs 110 and 120 and the wheels of the rear wheel legs 130 and 140 is equal to or narrower than the threshold (S222/No), the moving body 100 continues movement of the wheels of the front wheel legs 110 and 120 and the wheels of the rear wheel legs 130 and 140, and returns to Step S222 again to perform the determination. On the other hand, in a case where the space between the wheels of the front wheel legs 110 and 120 and the wheels of the rear wheel legs 130 and 140 is wider than the threshold (S222/Yes), the moving body 100 stops the four-wheel inverted pendulum control (S223).

Next, the moving body 100 determines whether or not the postures of the front wheel legs 110 and 120 and rear wheel legs 130 and 140 have reached the target state of (4) in FIG. 8 (S224). Note that the state of (4) in FIG. 8 is a state where the first links 132 and 142 and second links 134 and 144 of the rear wheel legs 130 and 140 are aligned on a straight line.

In a case where the postures of the front wheel legs 110 and 120 and rear wheel legs 130 and 140 have not reached the target state (S224/No), the moving body 100 continues movement of the wheels of the front wheel legs 110 and 120 and the wheels of the rear wheel legs 130 and 140, and returns to Step S224 to perform the determination again.

On the other hand, in a case where the postures of the front wheel legs 110 and 120 and rear wheel legs 130 and 140 have reached the target state (S224/Yes), the moving body 100 stops the actions of the front wheel legs 110 and 120 and rear wheel legs 130 and 140 of Step S221 (S225).

Thereafter, the moving body 100 makes the first joints 131 and 141 and second joints 133 and 143 of the rear wheel legs 130 and 140 movable (S226). As a result, the moving body 100 transitions to the state of (3) in FIG. 8 where the first links 132 and 142 and second links 134 and 144 of the rear wheel legs 130 and 140 are at right angles, and thereafter transitions to the state of (2) in FIG. 8 where the second links 134 and 144 of the rear wheel legs 130 and 140 are perpendicular to the ground-contacting surface.

Next, the moving body 100 makes only the first joints 131 and 141 and second joints 133 and 143 of the rear wheel legs 130 and 140 movable (S227). As a result, the moving body 100 can transition to the four-wheel travel mode.

By actuating the rear wheel legs 130 and 140 stepwise in such a manner, the moving body 100 can reduce loads applied onto the first joints 131 and 141 of the rear wheel legs 130 and 140. Accordingly, the moving body 100 can reduce the possibility of malfunctioning caused by concentration of loads.

According to the actions described above, the moving body 100 can transform from the posture in the inverted pendulum travel mode in which the body 150 is controlled as a four-wheel inverted pendulum to the posture in the four-wheel travel mode in which stable high speed travelling is possible.

(Transition between Stop Mode and Four-Wheel Travel Mode)

Figure 11:
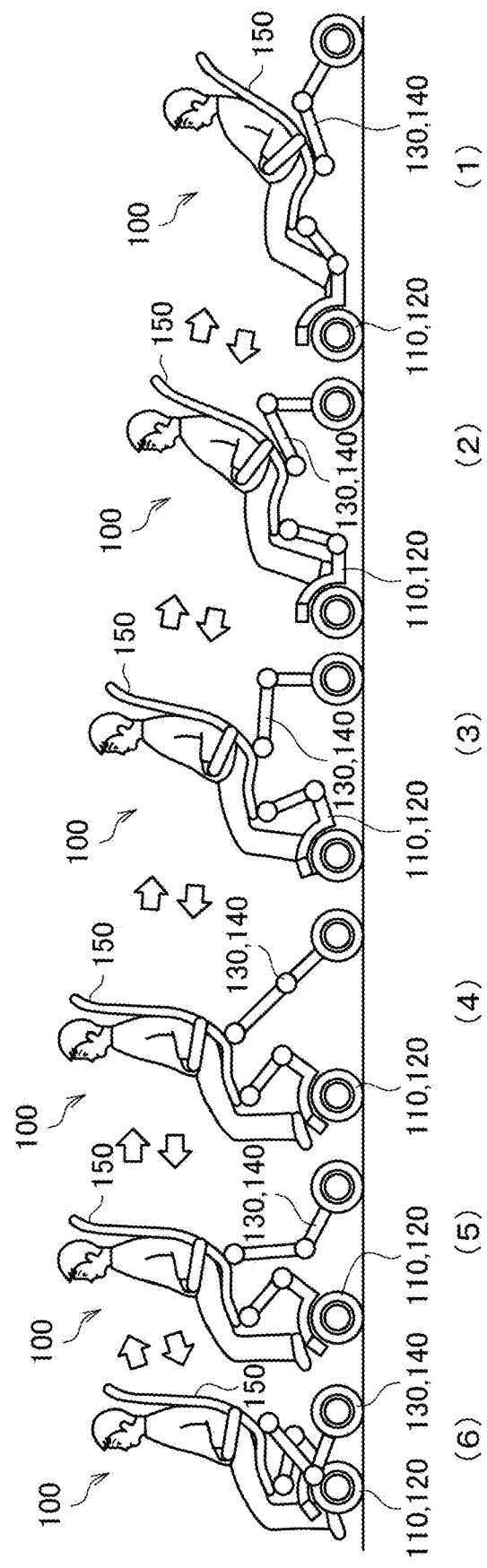
FIG. 11 is a schematic diagram depicting steps of transformations between the stop mode and the four-wheel travel mode.
Figure 12:
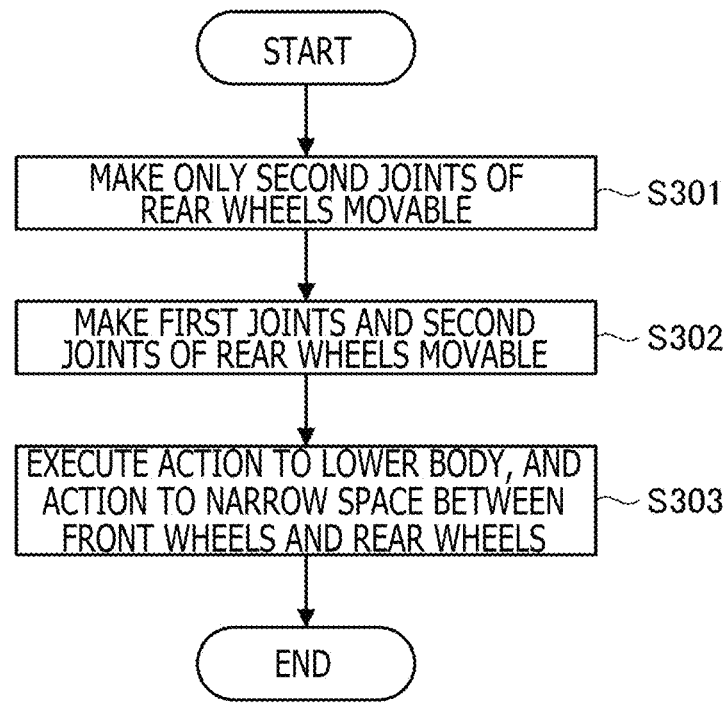
FIG. 12 is a flowchart diagram depicting a procedure of control of a transformation from the posture in the four-wheel travel mode to the posture in the stop mode.
Figure 13:
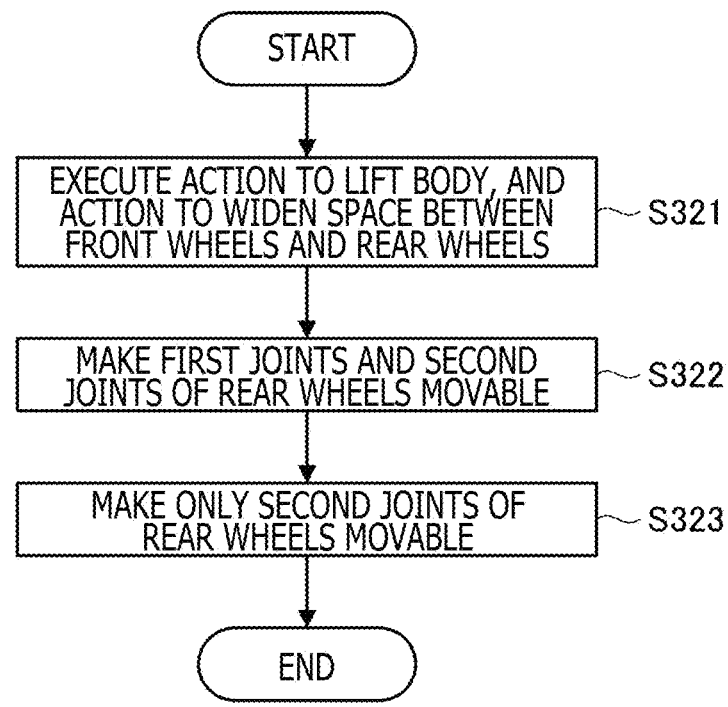
FIG. 13 is a flowchart diagram depicting a procedure of control of a transformation from the posture in the stop mode to the posture in the four-wheel travel mode.

FIG. 11 is a schematic diagram depicting steps of transformations between the stop mode and the four-wheel travel mode. FIG. 12 is a flowchart diagram depicting a procedure of control of a transformation from the posture in the four-wheel travel mode to the posture in the stop mode. FIG. 13 is a flowchart diagram depicting a procedure of control of a transformation from the posture in the stop mode to the posture in the four-wheel travel mode.

The procedure of control in a case where the moving body 100 transforms from the posture in the four-wheel travel mode (the state of (1) in FIG. 11) to the posture in the stop mode (the state of (6) in FIG. 11) is explained with reference to FIG. 11 and FIG. 12.

As depicted in FIG. 12, first, the moving body 100 make only the second joints 133 and 143 movable while keeping the first joints 131 and 141 of the rear wheel legs 130 and 140 unmovable (S301). As a result, the moving body 100 transitions to the state of (2) in FIG. 11 where the second links 134 and 144 of the rear wheel legs 130 and 140 become perpendicular to the ground-contacting surface.

Next, the moving body 100 makes the first joints 131 and 141 and second joints 133 and 143 of the rear wheel legs 130 and 140 movable (S302). As a result, the moving body 100 transitions to the state of (3) in FIG. 11 where the first links 132 and 142 and second links 134 and 144 of the rear wheel legs 130 and 140 are at right angles, and thereafter transitions to the state of (4) in FIG. 11 where the first links 132 and 142 and second links 134 and 144 of the rear wheel legs 130 and 140 are aligned on a straight line.

By actuating the rear wheel legs 130 and 140 stepwise in such a manner, the moving body 100 can reduce loads applied onto the first joints 131 and 141 of the rear wheel legs 130 and 140. Accordingly, the moving body 100 can reduce the possibility of malfunctioning caused by concentration of loads.

Thereafter, the moving body 100 starts execution of an action to lower the body 150 and an action to narrow the space between the wheels of the front wheel legs 110 and 120 and the wheels of the rear wheel legs 130 and 140 (S303). As a result, the moving body 100 can transition to the state of (5) in FIG. 11, and further transition to the stop mode.

According to the actions described above, the moving body 100 can transform from the posture in the four-wheel travel mode in which stable high speed travelling is possible to the posture in the stop mode in which the body 150 is made stationary stably.

The procedure of control in a case where the moving body 100 transforms from the posture in the stop mode (the state of (6) in FIG. 11) to the posture in the four-wheel travel mode (the state of (1) in FIG. 11) is explained with reference to FIG. 11 and FIG. 13.

As depicted in FIG. 13, first, the moving body 100 starts execution of an action to lift the body 150 and an action to widen the space between the wheels of the front wheel legs 110 and 120 and the wheels of the rear wheel legs 130 and 140 (S321). As a result, the moving body 100 transitions to the state of (5) in FIG. 11.

Next, the moving body 100 makes the first joints 131 and 141 and second joints 133 and 143 of the rear wheel legs 130 and 140 movable (S322). As a result, the moving body 100 transitions to the state of (4) in FIG. 11 where the first links 132 and 142 and second links 134 and 144 of the rear wheel legs 130 and 140 are aligned on a straight line, and thereafter transitions to the state of (3) in FIG. 11 where the first links 132 and 142 and second links 134 and 144 of the rear wheel legs 130 and 140 are at right angles. Further, the moving body 100 transitions to the state of (2) in FIG. 11 where the second links 134 and 144 of the rear wheel legs 130 and 140 become perpendicular to the ground-contacting surface.

Next, the moving body 100 makes only the second joints 133 and 143 movable while keeping the first joints 131 and 141 of the rear wheel legs 130 and 140 unmovable (S323). As a result, the moving body 100 can transition to the four-wheel travel mode.

By actuating the rear wheel legs 130 and 140 stepwise in such a manner, the moving body 100 can reduce loads applied onto the first joints 131 and 141 of the rear wheel legs 130 and 140. Accordingly, the moving body 100 can reduce the possibility of malfunctioning caused by concentration of loads.

According to the actions described above, the moving body 100 can transform from the posture in the stop mode in which the body 150 is made stationary stably to the posture in the four-wheel travel mode in which stable high speed travelling is possible.

(2.2. Posture Control)

Next, posture control in the inverted pendulum travel mode of the moving body 100 according to the present embodiment is explained with reference to FIG. 14 to FIG. 17. The moving body 100 in the inverted pendulum travel mode controls the posture by the inverted pendulum control with the two wheels of the front wheel legs 110 and 120, the inverted pendulum control with the two wheels of the rear wheel legs 130 and 140, or the inverted pendulum control with the four wheels of the front wheel legs 110 and 120 and rear wheel legs 130 and 140.

Figure 14:
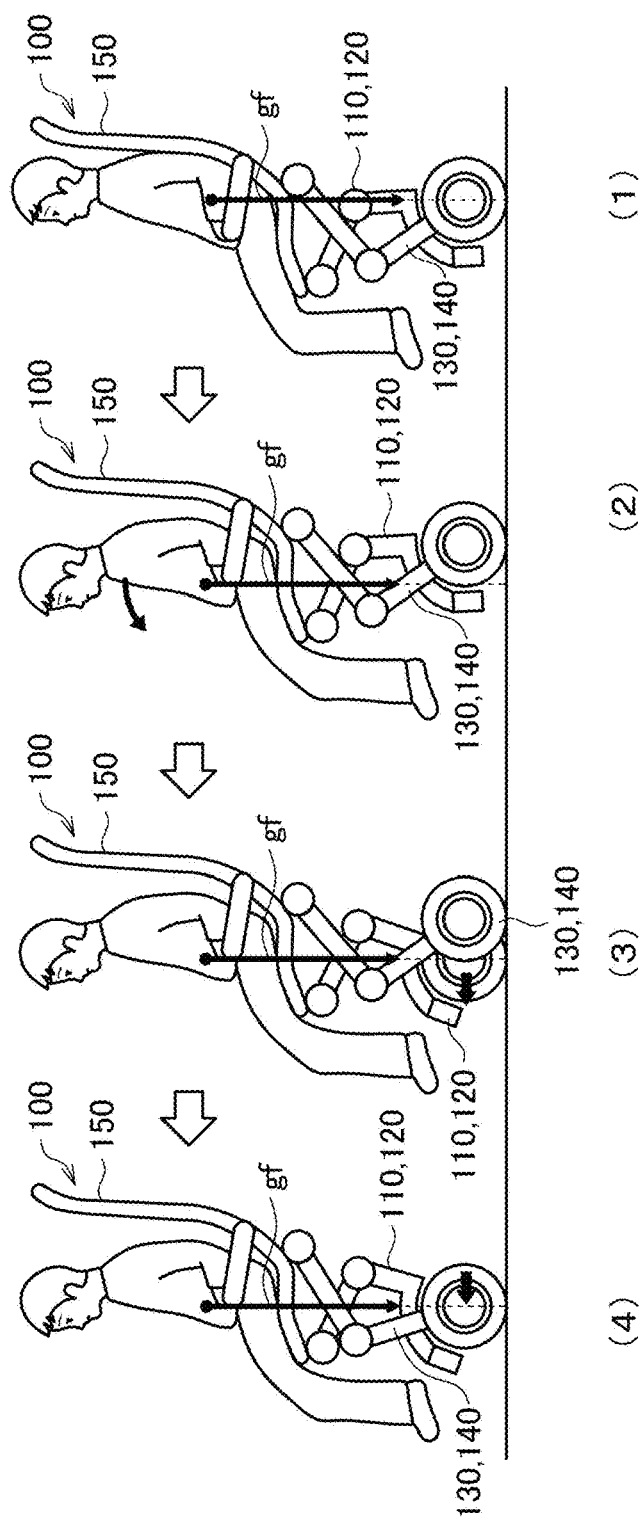
FIG. 14 is a schematic diagram depicting a mode of posture control of the moving body in the inverted pendulum travel mode.
Figure 15:
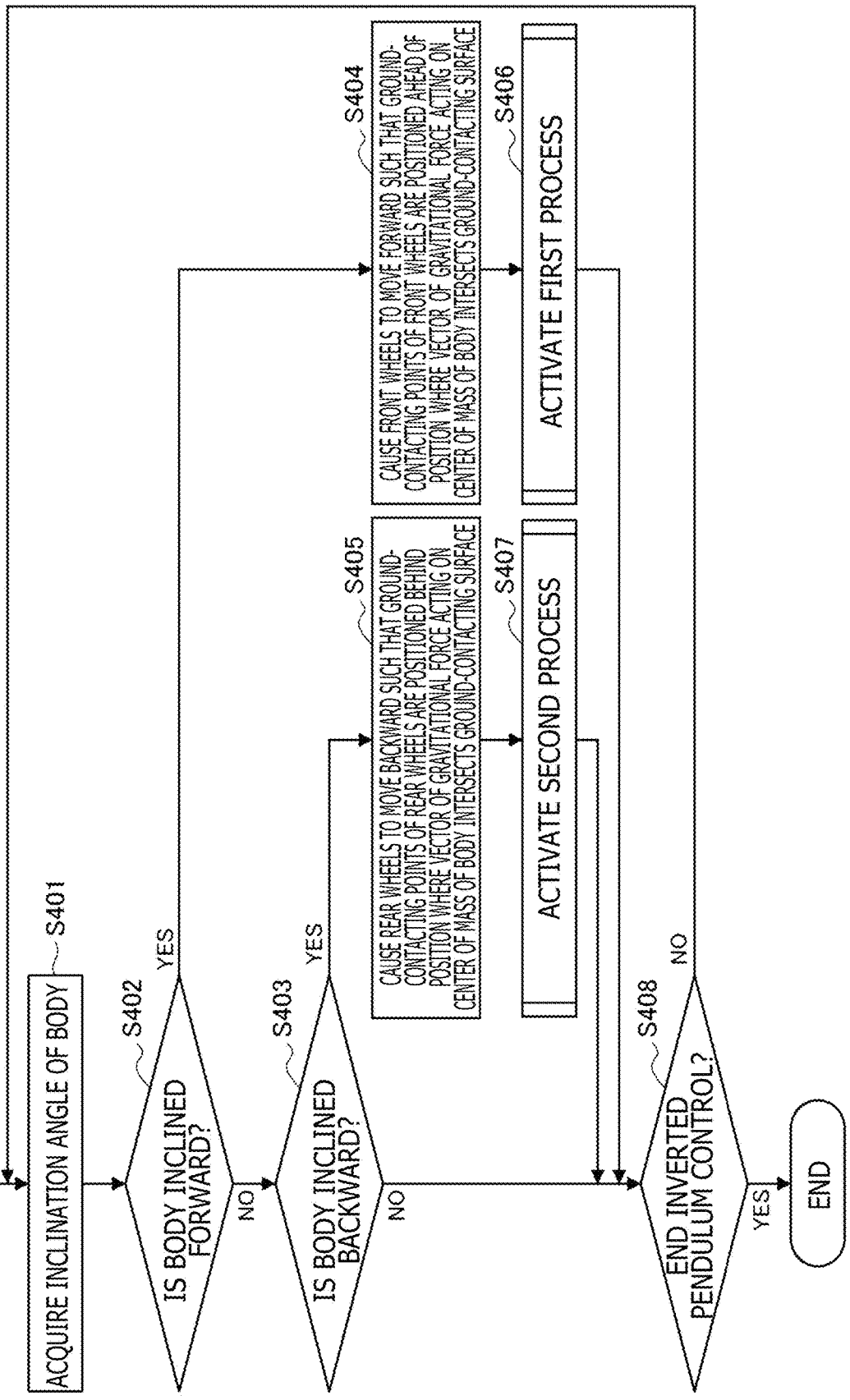
FIG. 15 is a flowchart diagram depicting a procedure of the posture control of the moving body in the inverted pendulum travel mode.
Figure 16:
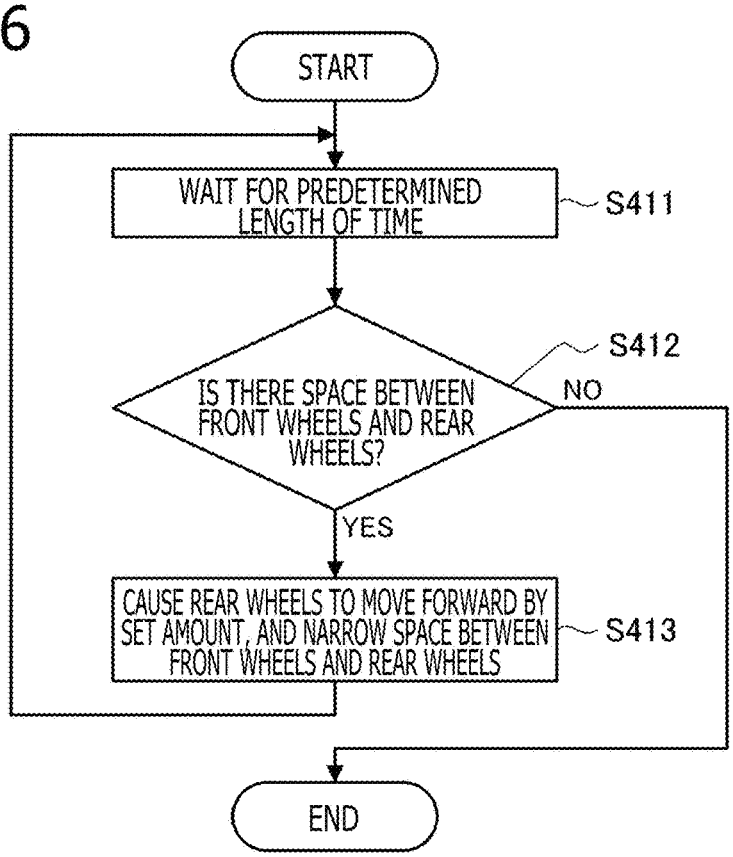
FIG. 16 is a flowchart diagram depicting a specific procedure of a first process in FIG. 15.
Figure 17:
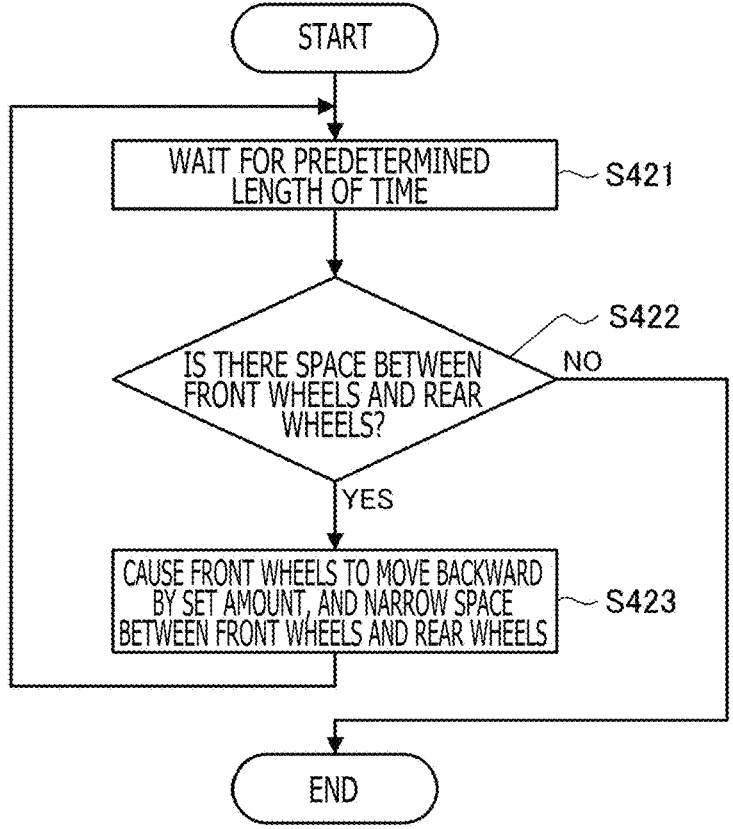
FIG. 17 is a flowchart diagram depicting a specific procedure of a second process in FIG. 15.

FIG. 14 is a schematic diagram depicting a mode of posture control of the moving body 100 in the inverted pendulum travel mode. FIG. 15 is a flowchart diagram depicting a procedure of the posture control of the moving body 100 in the inverted pendulum travel mode. FIG. 16 is a flowchart diagram depicting a specific procedure of a first process activated in Step S406 in FIG. 15. FIG. 17 is a flowchart diagram depicting a specific procedure of a second process activated at Step S407 in FIG. 15.

As depicted in FIG. 15, in the inverted pendulum travel mode, the moving body 100 (the state of (1) in FIG. 14) acquires the inclination angle of the body 150 by a gyro sensor or the like at a predetermined timing (S401). In addition, the moving body 100 determines from the acquired inclination angle whether or not the body 150 is inclined forward in the advancing direction (S402).

For example, in a case where the body 150 is inclined forward in the advancing direction and is in the state of (2) in FIG. 14 (S402/Yes), the moving body 100 causes the wheels of the front wheel legs 110 and 120 to move forward such that the ground-contacting points of the wheels of the front wheel legs 110 and 120 are positioned ahead of a position where the vector of the gravitational force gf acting on the center of mass of the body 150 (also including a user riding the body 150) intersects the ground-contacting surface (S404). As a result, the moving body 100 is in the state of (3) in FIG. 14.

Thereafter, the moving body 100 activates the first process (S406). In the first process, the positions of the wheels of the rear wheel legs 130 and 140 are controlled such that they overlap the positions of the wheels of the front wheel legs 110 and 120. As a process different from the process of the posture control whose procedure is depicted in FIG. 15, the first process is executed in parallel with the process of the posture control whose procedure is depicted in FIG. 15.

Specifically, first, in the first process, as depicted in FIG. 16, after waiting for a predetermined length of time (S411), the moving body 100 determines whether or not there is a space between the wheels of the front wheel legs 110 and 120 and the wheels of the rear wheel legs 130 and 140 (S412). In a case where there is a space between the wheels of the front wheel legs 110 and 120 and the wheels of the rear wheel legs 130 and 140 (S412/Yes), the moving body 100 causes the wheels of the rear wheel legs 130 and 140 to move forward by a set amount, and narrows the space between the wheels of the front wheel legs 110 and 120 and the wheels of the rear wheel legs 130 and 140 (S413). Thereafter, the moving body 100 returns to Step S411, and, after waiting for a predetermined length of time, repeats the determination in Step S412. In a case where there is not a space between the wheels of the front wheel legs 110 and 120 and the wheels of the rear wheel legs 130 and 140 (S412/No), the moving body 100 determines that the positions of the wheels of the rear wheel legs 130 and 140 have been caused to overlap the positions of the wheels of the front wheel legs 110 and 120, and ends the first process. According to such a first process, the moving body 100 can suppress a sideways fall of the body 150 caused by an inclination, and also maintain the inverted pendulum control.

On the other hand, in a case where the body 150 is not inclined forward in the advancing direction (S402/No), the moving body 100 determines from the acquired inclination angle whether or not the body 150 is inclined backward in the advancing direction (S403).

In a case where the body 150 is inclined backward in the advancing direction (S403/Yes), the moving body 100 causes the wheels of the rear wheel legs 130 and 140 to move backward such that the ground-contacting points of the wheels of the rear wheel legs 130 and 140 are positioned behind a position where the vector of the gravitational force gf acting on the center of mass of the body 150 (also including the user riding the body 150) intersects the ground-contacting surface (S405).

Thereafter, the moving body 100 activates the second process (S407). In the second process, the positions of the wheels of the front wheel legs 110 and 120 are controlled such that they overlap the positions of the wheels of the rear wheel legs 130 and 140. Similarly to the first process, as a process different from the process of the posture control whose procedure is depicted in FIG. 15, the second process is executed in parallel with the process of the posture control whose procedure is depicted in FIG. 15 and the first process.

Specifically, first, in the second process, as depicted in FIG. 17, after waiting for a predetermined length of time (S421), the moving body 100 determines whether or not there is a space between the wheels of the front wheel legs 110 and 120 and the wheels of the rear wheel legs 130 and 140 (S422). In a case where there is a space between the wheels of the front wheel legs 110 and 120 and the wheels of the rear wheel legs 130 and 140 (S422/Yes), the moving body 100 causes the wheels of the front wheel legs 110 and 120 to move backward by a set amount, and narrows the space between the wheels of the front wheel legs 110 and 120 and the wheels of the rear wheel legs 130 and 140 (S423). Thereafter, the moving body 100 returns to Step S421, and, after waiting for a predetermined length of time, repeats the determination in Step S422. In a case where there is not a space between the wheels of the front wheel legs 110 and 120 and the wheels of the rear wheel legs 130 and 140 (S422/No), the moving body 100 determines that the positions of the wheels of the front wheel legs 110 and 120 and the positions of the wheels of the rear wheel legs 130 and 140 have been caused to overlap, and ends the second process. According to such a second process, the moving body 100 can suppress a sideways fall of the body 150 caused by an inclination, and also maintain the inverted pendulum control.

Until it is determined to end the inverted pendulum control (S408/Yes), the moving body 100 repetitively executes the actions from Step S401 to Step S407 described above, and activates the first process and the second process according to the inclination angle of the body 150. Owing to the first process and the second process, the moving body 100 in the inverted pendulum travel mode can stably control the posture of the body 150 to prevent it from inclining.

Note that the determinations in Step S402 and Step S403 described above may be performed in this order as described above, i.e., the determination in step S403 is performed after the determination in step S402, or may be performed in the reversed order, i.e., the determination in step S402 is performed after the determination in step S403.

(2.3. Movement Control)

Next, movement control in the inverted pendulum travel mode of the moving body 100 according to the present embodiment is explained with reference to FIG. 18 to FIG. 23. Hereinbelow, travelling on a level ground, movement to ascend steps, and movement to descend steps are explained separately as movement of the moving body 100 in the inverted pendulum travel mode.

(Travelling on Level Ground)

Figure 18:
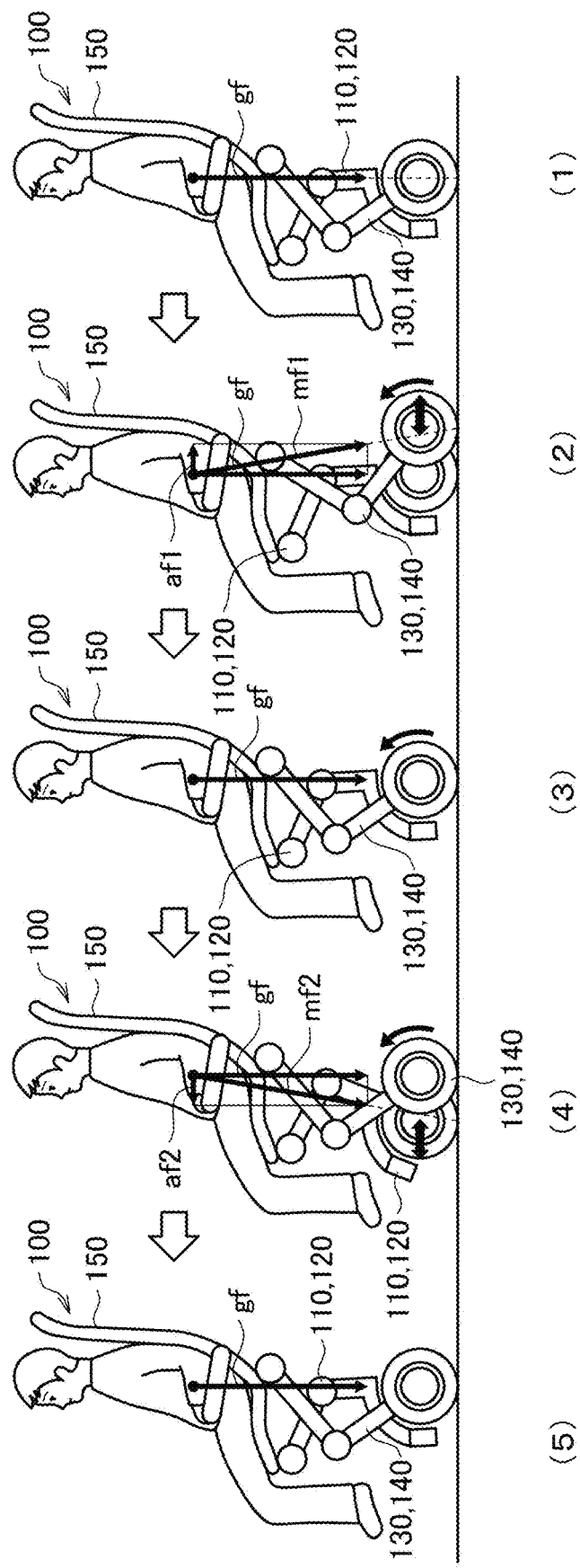
FIG. 18 is a schematic diagram depicting a mode of level ground travel control of the moving body in the inverted pendulum travel mode.
Figure 19:
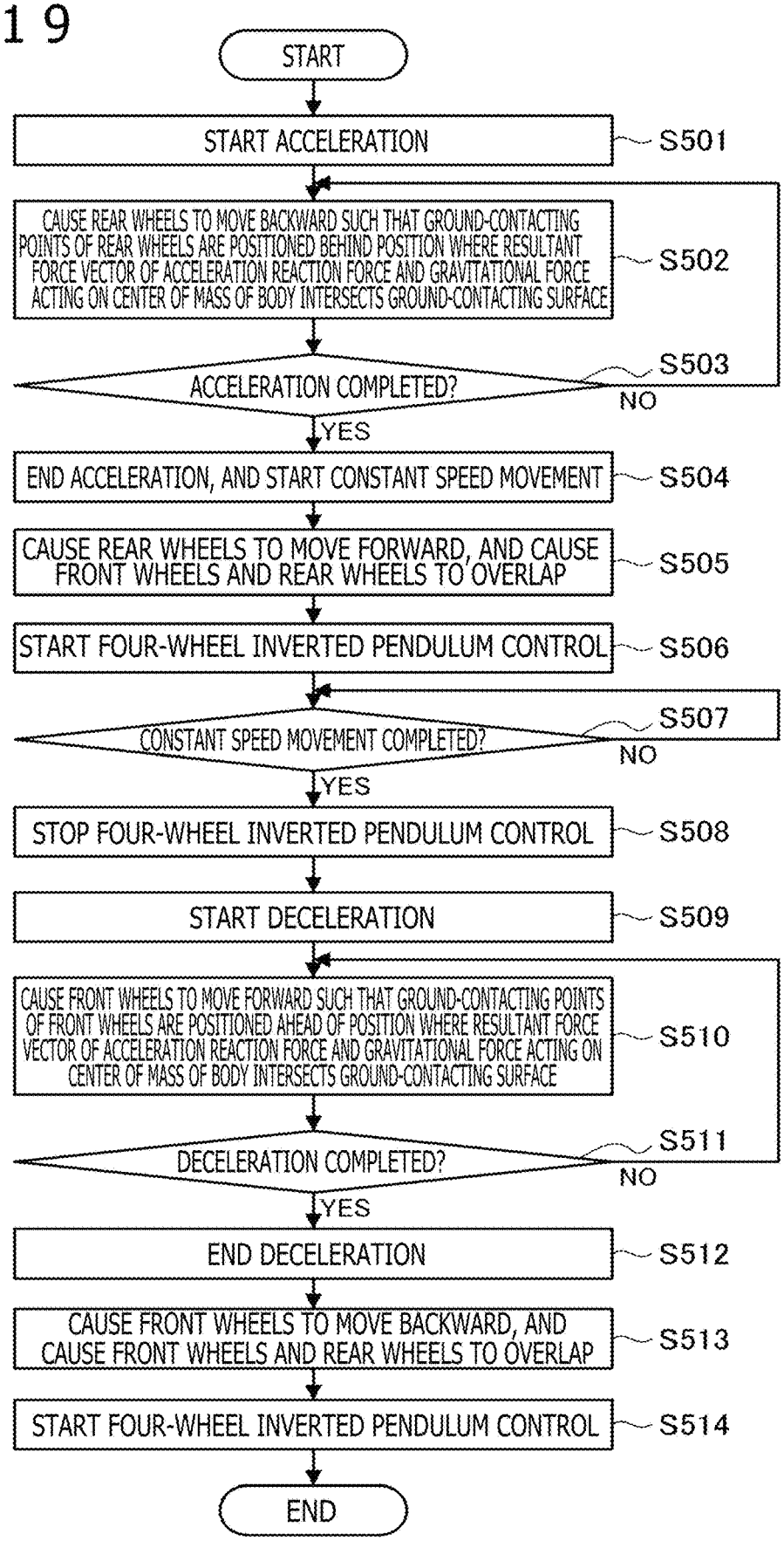
FIG. 19 is a flowchart diagram depicting a procedure of the level ground travel control of the moving body in the inverted pendulum travel mode.

FIG. 18 is a schematic diagram depicting a mode of level ground travel control of the moving body 100 in the inverted pendulum travel mode. FIG. 19 is a flowchart diagram depicting a procedure of the level ground travel control of the moving body 100 in the inverted pendulum travel mode.

As depicted in FIG. 19, first, the moving body 100 in the stopped state (the state of (1) in FIG. 18) starts travelling by starting acceleration (S501). Next, the moving body 100 causes the wheels of the rear wheel legs 130 and 140 to move backward such that the ground-contacting points of the wheels of the rear wheel legs 130 and 140 are positioned behind a position where a resultant force vector mf1 of an acceleration reaction force af1 and the gravitational force gf acting on the center of mass of the body 150 (also including a user riding the body 150) intersects the ground-contacting surface (S502). As a result, the moving body 100 can be in the state of (2) in FIG. 18, and also suppress inclination of the body 150 caused by the acceleration reaction force af1.

Next, the moving body 100 determines whether or not the acceleration has been completed (S503). In a case where the acceleration has not been completed (S503/No), the moving body 100 continues the acceleration while performing the action of Step S502. In a case where the acceleration has been completed (S503/Yes), the moving body 100 ends the acceleration, and starts constant speed movement (S504).

Subsequently, by causing the wheels of the rear wheel legs 130 and 140 to move forward, the moving body 100 causes the positions of the wheels of the front wheel legs 110 and 120 and the positions of the wheels of the rear wheel legs 130 and 140 to overlap (S505). As a result, the moving body 100 is in the state of (3) in FIG. 18, and accordingly can maintain the posture in a stabilized state by performing the four-wheel inverted pendulum control (S506).

Thereafter, the moving body 100 determines whether or not the constant speed movement has been completed (S507), and in a case where the constant speed movement has been completed (S507/Yes), stops the four-wheel inverted pendulum control (S508). Note that, in a case where the constant speed movement has not been completed (S507), the moving body 100 continues the constant speed movement, and returns to Step S507 to perform determination again.

The moving body 100 having completed the constant speed movement starts deceleration (S509). Next, the moving body 100 causes the wheels of the front wheel legs 110 and 120 to move forward such that the ground-contacting points of the wheels of the front wheel legs 110 and 120 are positioned ahead of a position where a resultant force vector mf2 of an acceleration reaction force af2 and the gravitational force gf acting on the center of mass of the body 150 (also including the user riding the body 150) intersects the ground-contacting surface (S510). As a result, the moving body 100 can be in the state of (4) in FIG. 18, and also suppress inclination of the body 150 caused by the acceleration reaction force af2.

Thereafter, the moving body 100 determines whether or not the deceleration has been completed (S511). In a case where the deceleration has not been completed (S511/No), the moving body 100 continues the deceleration while performing the action of Step S510. In a case where the deceleration has been completed (S511/Yes), the moving body 100 ends the deceleration, and is in the stopped state (S512).

Next, by causing the wheels of the front wheel legs 110 and 120 to move backward, the moving body 100 causes the positions of the wheels of the front wheel legs 110 and 120 and the positions of the wheels of the rear wheel legs 130 and 140 to overlap (S513). As a result, the moving body 100 is in the state of (5) in FIG. 18, and accordingly can maintain the posture in a stabilized state by starting the four-wheel inverted pendulum control (S514).

According to the actions described above, by controlling the wheels of the front wheel legs 110 and 120 and the wheels of the rear wheel legs 130 and 140 individually, the moving body 100 can perform acceleration and deceleration while maintaining the posture of the body 150 (i.e., the posture of the user riding the body 150). Specifically, the moving body 100 controls the positions of the wheels of the front wheel legs 110 and 120 and the positions of the wheels of the rear wheel legs 130 and 140 such that a resultant force vector of an acceleration reaction force and the gravitational force applied to the body 150 intersects the ground-contacting surface between the wheels of the front wheel legs 110 and 120 and the wheels of the rear wheel legs 130 and 140. As a result, the moving body 100 can perform acceleration and deceleration without causing a forward or backward inclination of the body 150 in the advancing direction by an acceleration reaction force.

(Movement to Ascend Steps)

Figure 20:
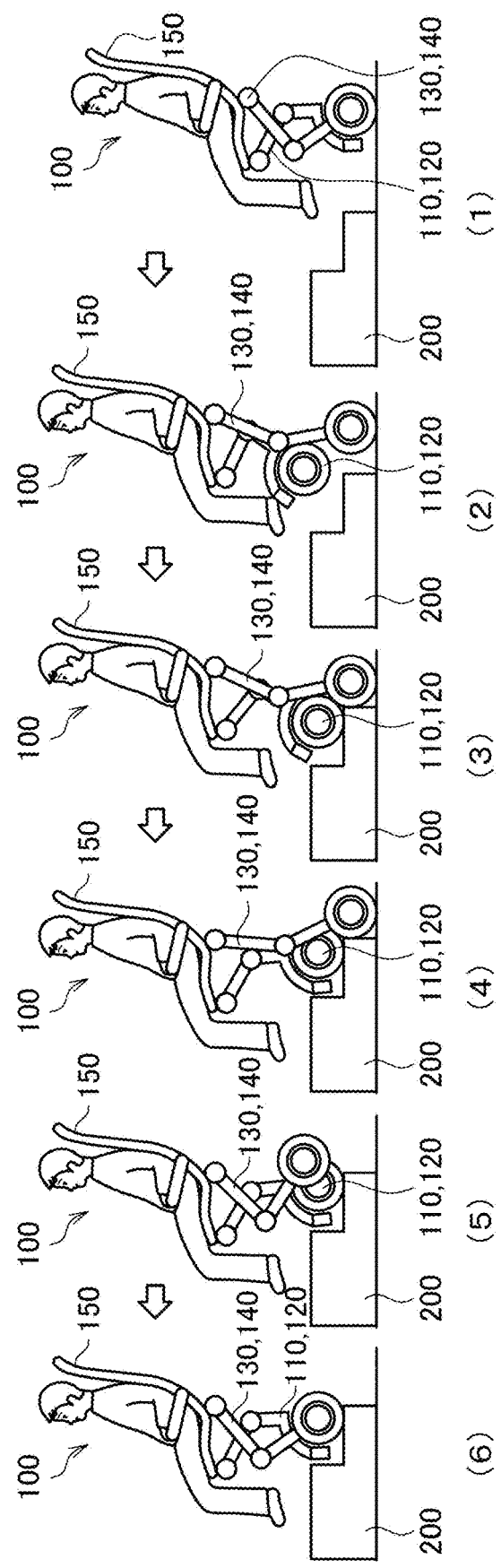
FIG. 20 is a schematic diagram depicting a mode of step ascending control of the moving body in the inverted pendulum travel mode.
Figure 21:
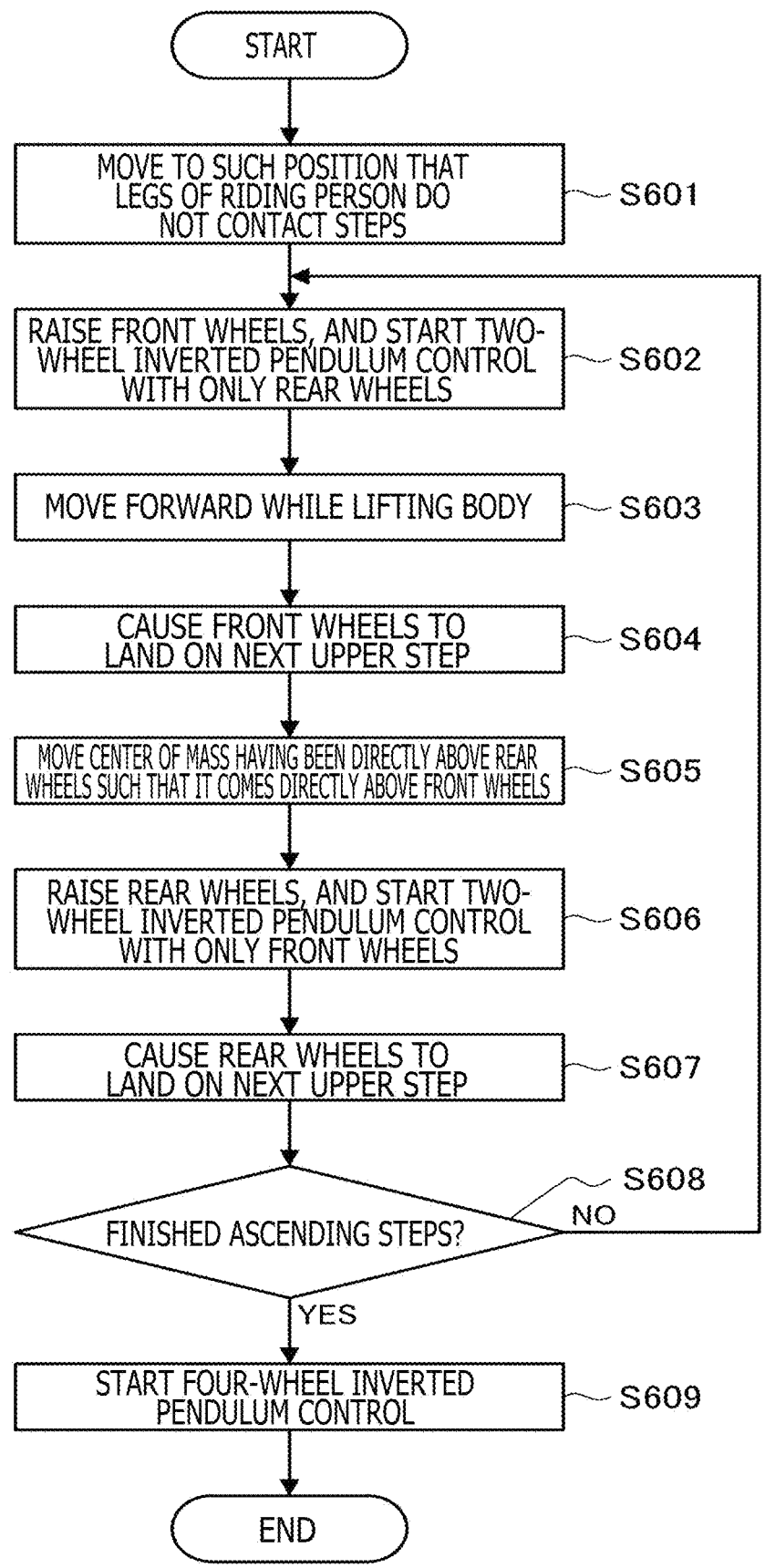
FIG. 21 is a flowchart diagram depicting a procedure of the step ascending control of the moving body in the inverted pendulum travel mode.

FIG. 20 is a schematic diagram depicting a mode of step ascending control of the moving body 100 in the inverted pendulum travel mode. FIG. 21 is a flowchart diagram depicting a procedure of the step ascending control of the moving body 100 in the inverted pendulum travel mode.

As depicted in FIG. 21, first, the moving body 100 moves to such a position that the legs of a user riding the moving body 100 do not contact steps 200 as in the state of (1) in FIG. 20 (S601).

Next, the moving body 100 raises the wheels of the front wheel legs 110 and 120, and starts two-wheel inverted pendulum control only with the wheels of the rear wheel legs 130 and 140, as in the state of (2) in FIG. 20 (S602). Then, the moving body 100 moves forward while lifting the body 150 (S603), and causes the wheels of the front wheel legs 110 and 120 to land on the next upper step of the steps 200 as in the state of (3) in FIG. 20 (S604).

Subsequently, the moving body 100 moves the center of mass of the body 150 (also including the user riding the body 150) having been above the wheels of the rear wheel legs 130 and 140, such that it comes above the wheels of the front wheel legs 110 and 120, as in the state of (4) in FIG. 20 (S605).

Then, the moving body 100 raises the wheels of the rear wheel legs 130 and 140, and starts the two-wheel inverted pendulum control only with the wheels of the front wheel legs 110 and 120, as in the state of (5) in FIG. 20 (S606). Subsequently, the moving body 100 causes the wheels of the rear wheel legs 130 and 140 to land on the next upper step of the steps 200 as in the state of (6) in FIG. 20 (S607).

The moving body 100 determines whether or not it has finished ascending the steps 200 (S608), and in a case where it has not finished ascending the steps 200 (S608/No), repetitively executes the actions of Step S602 to Step S607. In a case where it has finished ascending the steps 200 (S608/Yes), the moving body 100 starts the inverted pendulum control with the four wheels which are the wheels of the front wheel legs 110 and 120 and the wheels of the rear wheel legs 130 and 140 (S609).

According to the actions mentioned above, the moving body 100 can ascend the steps 200 by alternately switching the two-wheel inverted pendulum control with the wheels of the front wheel legs 110 and 120 and the two-wheel inverted pendulum control with the wheels of the rear wheel legs 130 and 140.

(Movement to Descend Steps)

Figure 22:
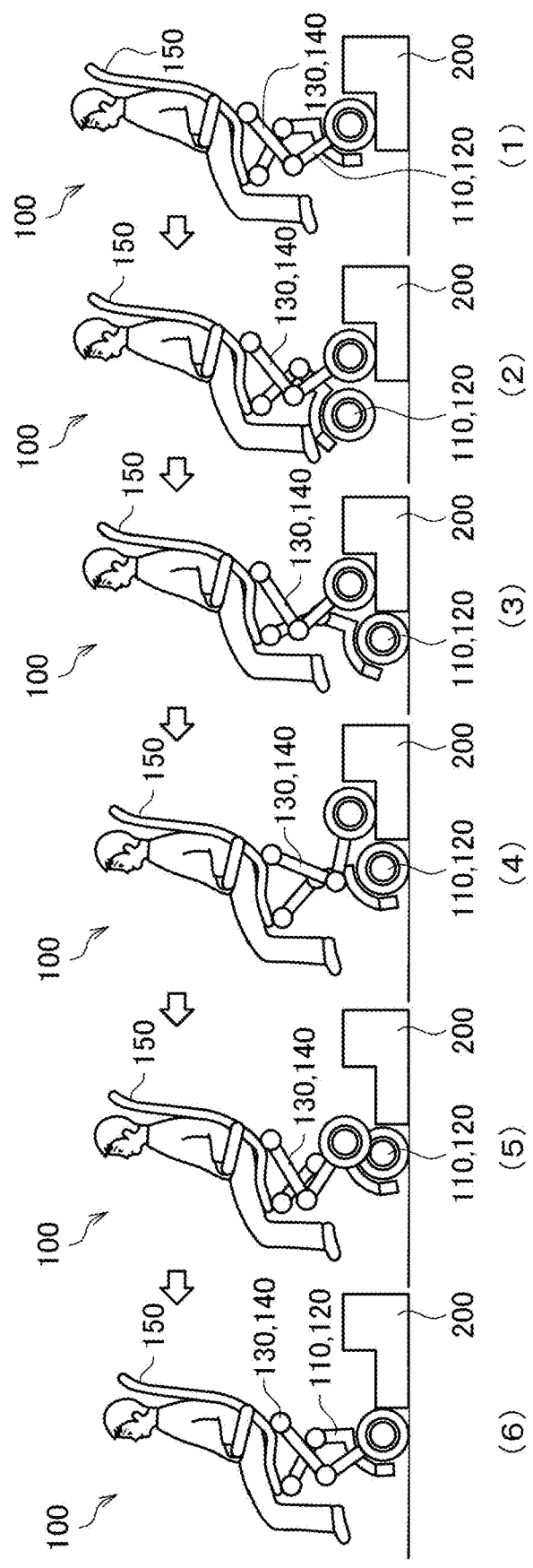
FIG. 22 is a schematic diagram depicting a mode of step descending control of the moving body in the inverted pendulum travel mode.
Figure 23:
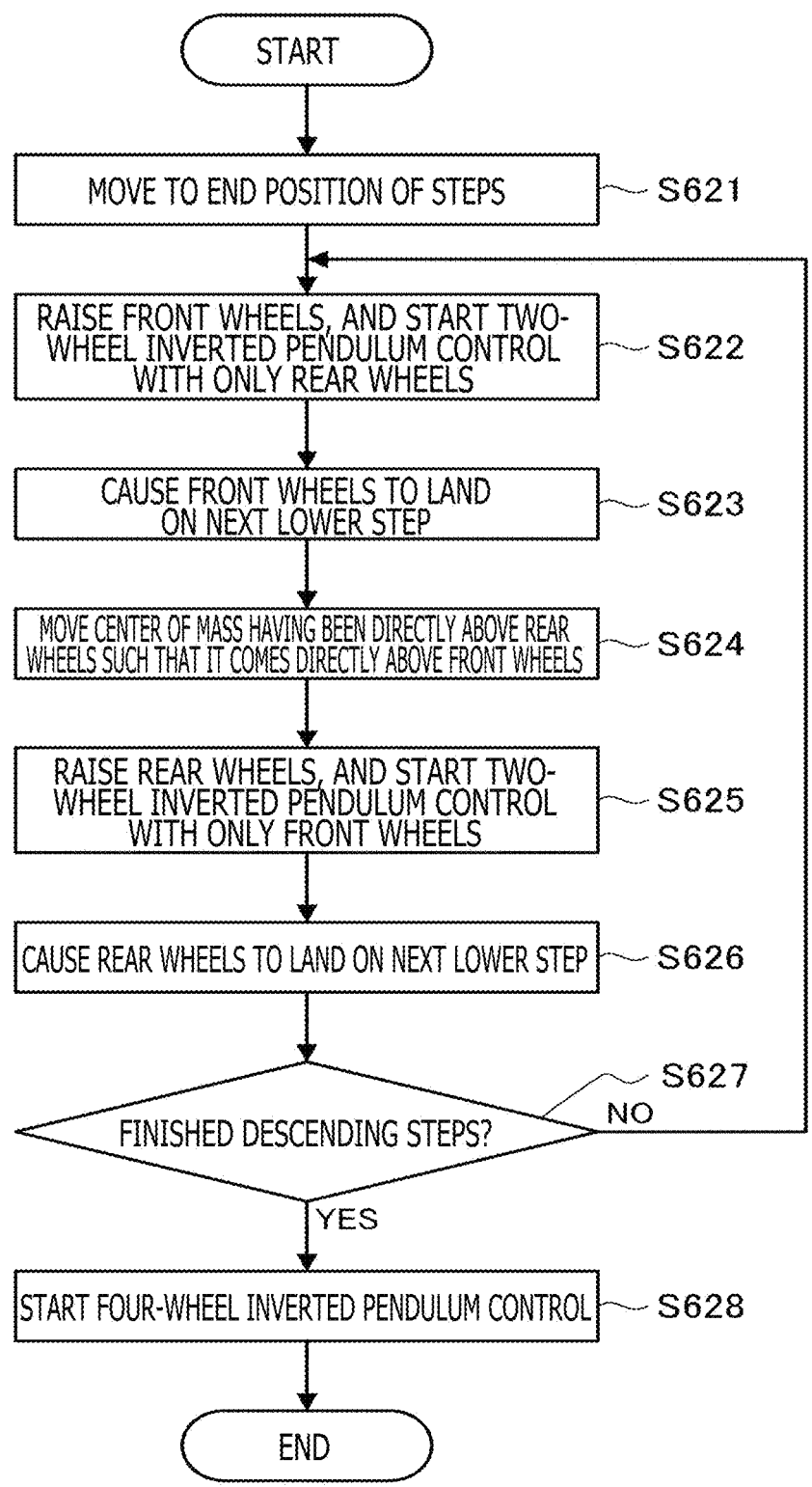
FIG. 23 is a flowchart diagram depicting a procedure of the step descending control of the moving body in the inverted pendulum travel mode.

FIG. 22 is a schematic diagram depicting a mode of step descending control of the moving body 100 in the inverted pendulum travel mode. FIG. 23 is a flowchart diagram depicting a procedure of the step descending control of the moving body 100 in the inverted pendulum travel mode.

As depicted in FIG. 23, first, the moving body 100 moves closer to an end position of the steps 200 as in the state of (1) in FIG. 22 (S621).

Next, the moving body 100 raises the wheels of the front wheel legs 110 and 120, and starts the two-wheel inverted pendulum control only with the wheels of the rear wheel legs 130 and 140, as in the state of (2) in FIG. 22 (S622). Then, the moving body 100 causes the wheels of the front wheel legs 110 and 120 to land on the next lower step of the steps 200 as in the state of (3) in FIG. 22 (S623).

Subsequently, the moving body 100 moves the center of mass of the body 150 (also including the user riding the body 150) having been above the wheels of the rear wheel legs 130 and 140, such that it comes above the wheels of the front wheel legs 110 and 120, as in the state of (4) in FIG. 22 (S624).

Next, the moving body 100 raises the wheels of the rear wheel legs 130 and 140, and starts the two-wheel inverted pendulum control only with the wheels of the front wheel legs 110 and 120, as in the state of (5) in FIG. 22 (S625). Then, the moving body 100 causes the wheels of the rear wheel legs 130 and 140 to land on the next lower step of the steps 200 as in the state of (6) in FIG. 22 (S626).

The moving body 100 determines whether or not it has finished descending the steps 200 (S627), and in a case where it has not finished descending the steps 200 (S627/No), repetitively executes the actions of Step S622 to Step S626. In a case where it has finished descending the steps 200 (S627/Yes), the moving body 100 starts the inverted pendulum control with the four wheels which are the wheels of the front wheel legs 110 and 120 and the wheels of the rear wheel legs 130 and 140 (S628).

According to the actions described above, the moving body 100 can descend the steps 200 by alternately switching the two-wheel inverted pendulum control with the wheels of the front wheel legs 110 and 120 and the two-wheel inverted pendulum control with the wheels of the rear wheel legs 130 and 140.

(2.4. Autonomous Control)

Further, autonomous action control of the moving body 100 according to the present embodiment is explained with reference to FIG. 24 to FIG. 27.

(First Autonomous Control)

Figure 24:
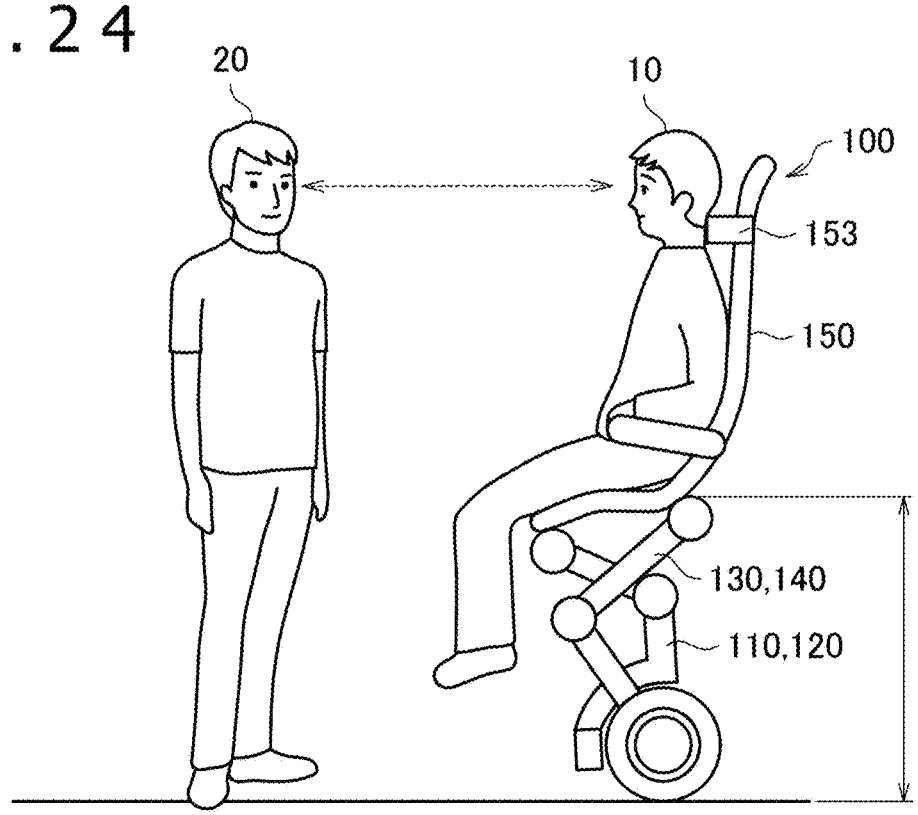
FIG. 24 is a schematic diagram depicting a mode of first autonomous control.
Figure 25:
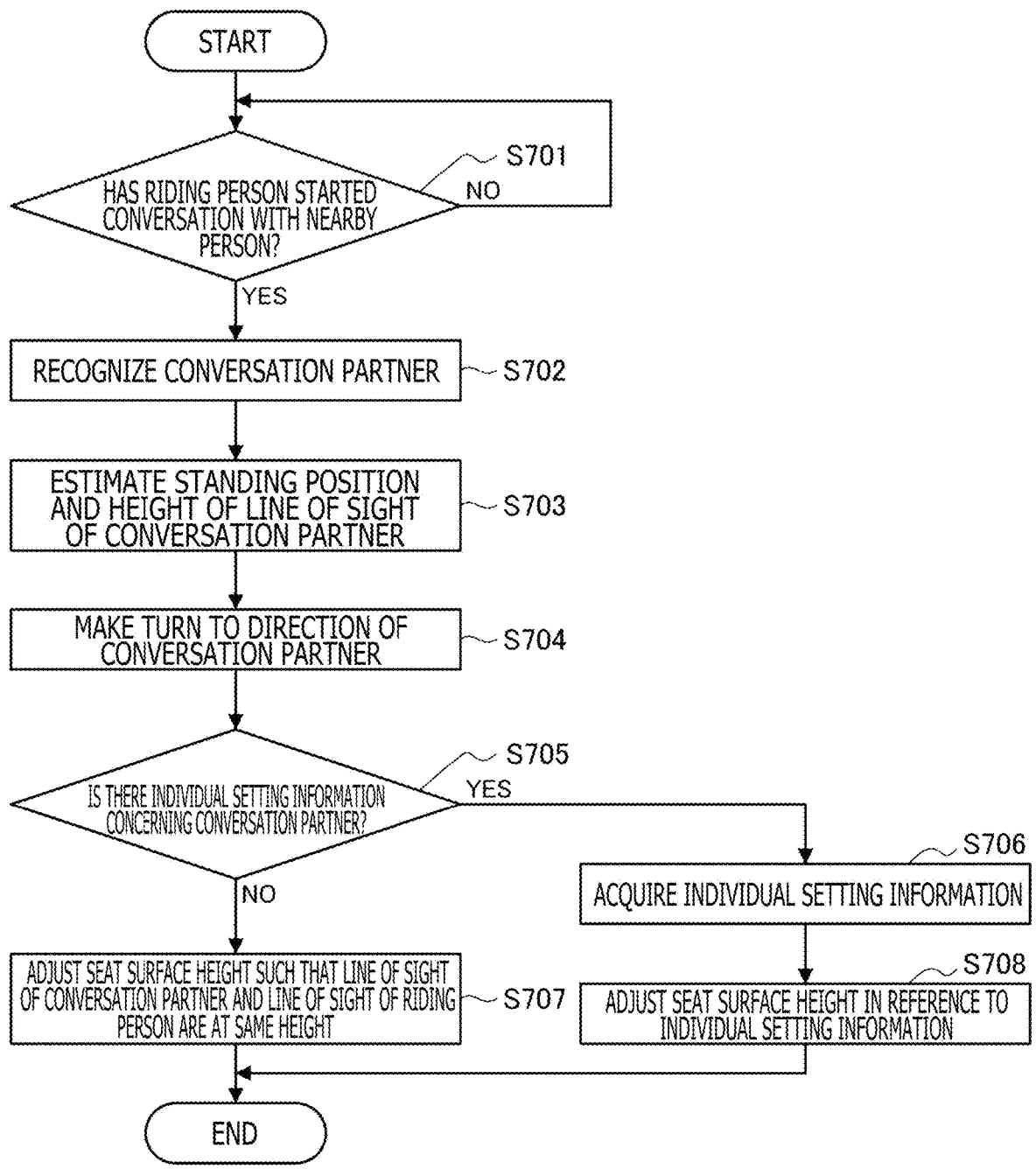
FIG. 25 is a flowchart diagram depicting a procedure of the first autonomous control.

FIG. 24 is a schematic diagram depicting a mode of first autonomous control. FIG. 25 is a flowchart diagram depicting a procedure of the first autonomous control. As depicted in FIG. 24, in the first autonomous control, the moving body 100 can control the posture such that a user 10 riding the moving body 100 and a second person 20 can communicate more smoothly.

Specifically, the moving body 100 may recognize the second person 20 communicating with the user 10, in reference to recognition results of images captured by an image-capturing apparatus included in the sensor section 153 or the like. As a result, the moving body 100 can automatically make a turn such that the user 10 faces the recognized second person 20. In addition, the moving body 100 can automatically control the height of the seat surface of the body 150 on which the user 10 is riding, such that the heights of the lines of sight of the recognized second person 20 and the user 10 match. Further, by human-recognition of the second person 20, the moving body 100 can control the posture or the like of the body 150 such that the user 10 and the second person 20 can communicate more smoothly according to the social relationship between the user 10 and the second person 20.

Such first autonomous control may be executed in accordance with the procedure depicted in FIG. 25, for example.

As depicted in FIG. 25, first, the moving body 100 determines whether or not the user 10 riding the moving body 100 has started a conversation with a nearby second person 20 (S701). For example, the moving body 100 may determine whether or not the user 10 has started a conversation with a second person 20, according to sounds collected by a microphone included in the sensor section 153 or images captured by the image-capturing apparatus included in the sensor section 153. Note that, in a case where the user 10 is not having a conversation with a second person 20 (S701/No), the moving body 100 returns to Step S701 at a predetermined timing to perform the determination again.

In a case where the user 10 has started a conversation with a second person 20 (S701/Yes), the moving body 100 recognizes the second person 20 having the conversation with the user 10, according to sounds collected by the microphone included in the sensor section 153 or images captured by the image-capturing apparatus included in the sensor section 153 (S702). Next, the moving body 100 estimates the standing position and the height of the line of sight of the second person 20 having the conversation with the user 10, according to sounds collected by the microphone included in the sensor section 153 or images captured by the image-capturing apparatus included in the sensor section 153 (S703).

Then, the moving body 100 makes a turn such that the user 10 faces the estimated standing position of the second person 20 (S704). Specifically, by making a turn at its position by differential control of the left and right wheels of the front wheel legs 110 and 120 and rear wheel legs 130 and 140, the moving body 100 causes the body 150 to face the standing position of the second person 20.

Here, the moving body 100 determines whether or not there is individual setting information concerning the second person 20 having the conversation with the user 10 (S705). In a case where there is the individual setting information (S705/Yes), the moving body 100 acquires the individual setting information corresponding to the second person 20 (S706), and adjusts the height of the seat surface of the body 150 on which the user 10 is riding, in reference to the acquired individual setting information (S708).

Individual setting information is such information as a height of the body 150 individually set for each second person 20 according to attributes of the second person 20 or the social relationship between the user 10 and the second person 20. By the individual setting information being set, the moving body 100 can individually adjust the height of the body 150 when the user 10 has a conversation with a particular partner.

For example, in a case where the second person 20 is a superior (e.g., a boss, etc.) of the user 10, the moving body 100 may control the height of the body 150 on which the user 10 is riding, such that the line of sight of the user 10 become lower than the line of sight of the second person 20.

On the other hand, in a case where there is not individual setting information (S705/No), the moving body 100 adjusts the height of the seat surface of the body 150 on which the user 10 is riding, such that the heights of the lines of sight of the second person 20 and the user 10 match (S707). This allows the user 10 to give the second person 20 a sense of security and a sense of affinity by causing the height of the line of sight of the user 10 to match the height of the line of sight of the second person 20.

According to the actions described above, the moving body 100 can allow the user 10 riding the moving body 100 and the second person 20 near the moving body 100 to communicate more smoothly.

(Second Autonomous Control)

Figure 26:
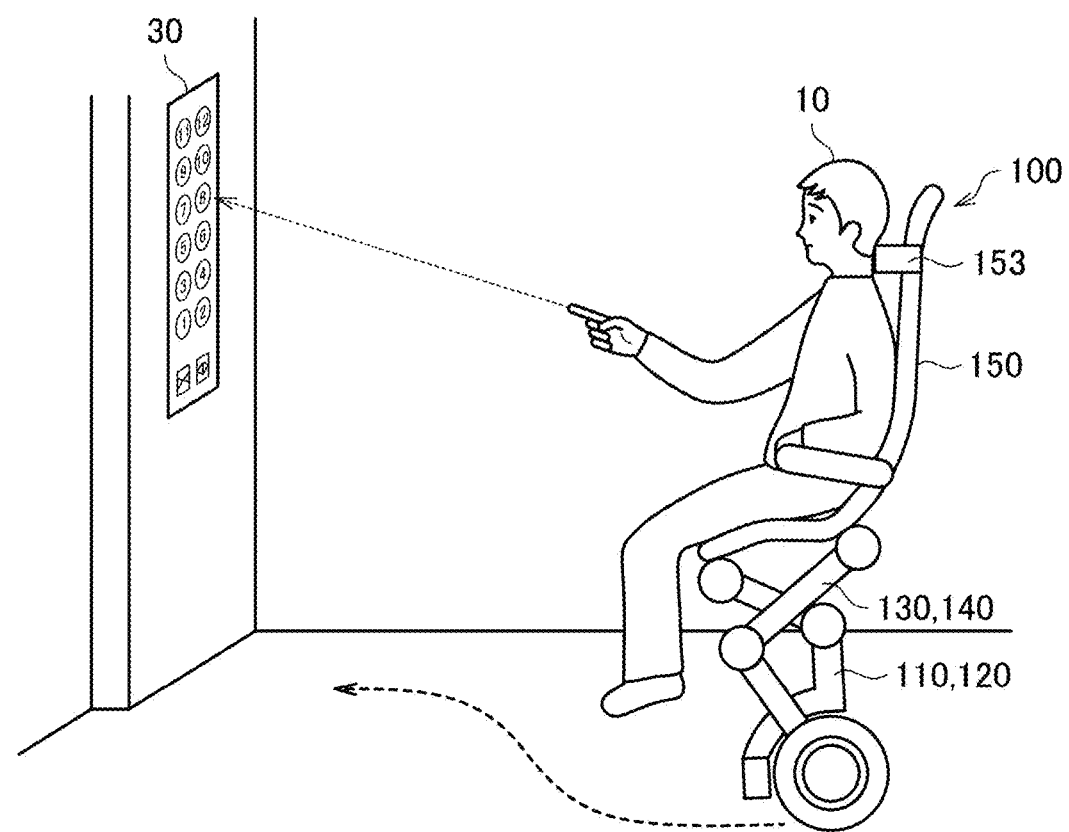
FIG. 26 is a schematic diagram depicting a mode of second autonomous control.
Figure 27:
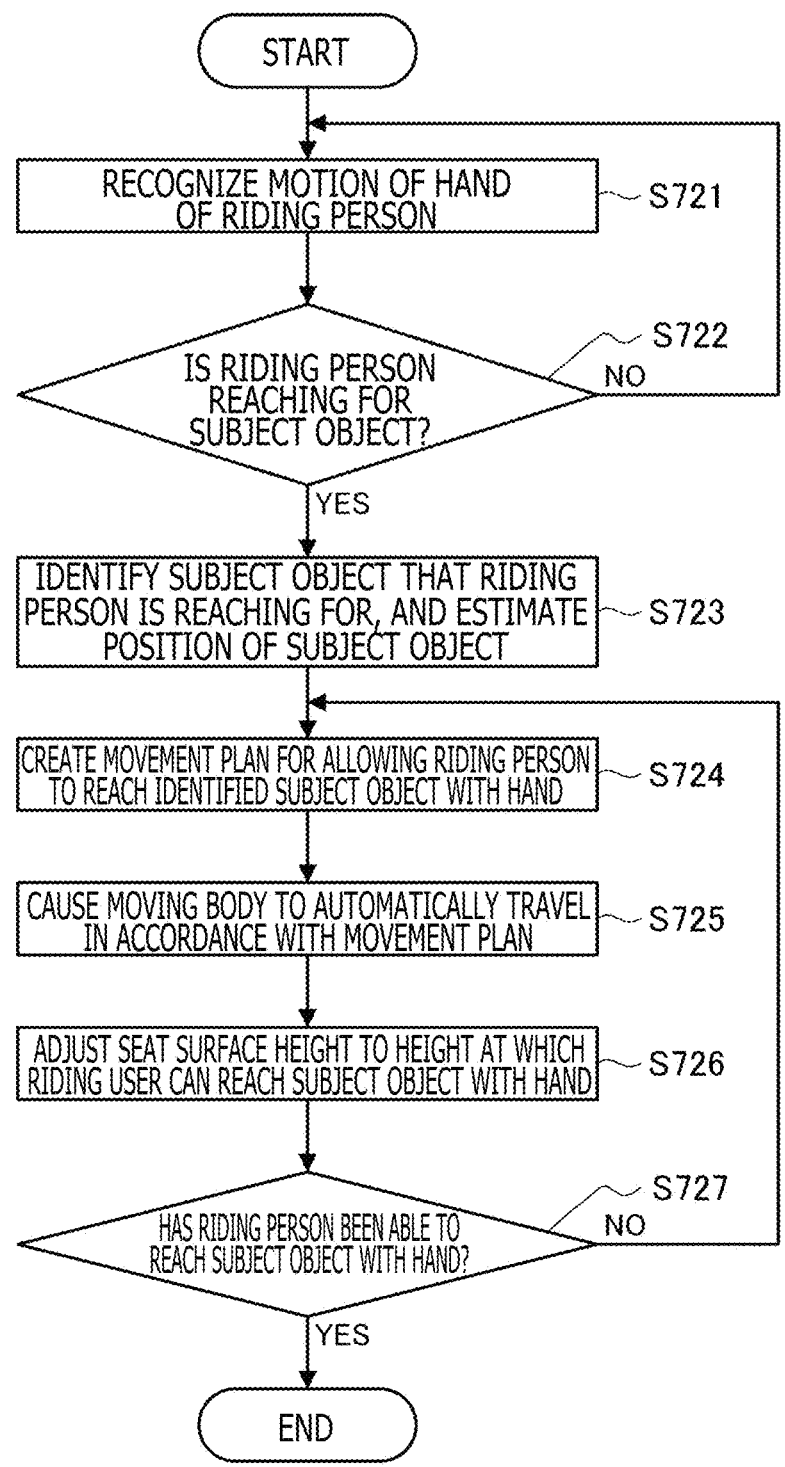
FIG. 27 is a flowchart diagram depicting a procedure of the second autonomous control.

FIG. 26 is a schematic diagram depicting a mode of second autonomous control. FIG. 27 is a flowchart diagram depicting a procedure of the second autonomous control. As depicted in FIG. 26, in the second autonomous control, the moving body 100 can control the posture such that the user 10 riding the moving body 100 can interact with a subject object 30 in the external environment more efficiently.

Specifically, the moving body 100 may recognize the subject object 30 in the external environment with which the user 10 is trying to interact, according to recognition results of images captured by the image-capturing apparatus included in the sensor section 153 or the like. For example, the moving body 100 may recognize a gesture of the user 10 and the external environment on the basis of images captured by the image-capturing apparatus included in the sensor section 153, and recognize the subject object 30 that is present in the external environment and inferred from the gesture of the user 10.

This allows the moving body 100 to autonomously move and also autonomously control the height of the seat surface of the body 150 on which the user 10 is riding, such that the user 10 can operate or hold the recognized subject object 30 easily. For example, the moving body 100 may autonomously move to be in front of the subject object 30 such as an operation button that the user 10 is trying to operate or a glass that the user 10 is trying to hold, and also autonomously control the height of the seat surface of the body 150 such that the user 10 can reach the subject object 30 with her/his hand.

In a case where the user 10 riding the moving body 100 tries to interact with the subject object 30 that is present in the external environment, the user 10 has to operate or hold the subject object 30 with either of her/his left and right hands while operating the moving body 100. In such a case, it becomes difficult for the user 10 to concentrate on the operation of the moving body 100 in some cases. In the second autonomous control, the moving body 100 can enhance convenience for the user 10 by performing autonomous movement and posture control such that it becomes easier for the user 10 to interact with the subject object 30.

Such second autonomous control may be executed in accordance with the procedure depicted in FIG. 27, for example.

As depicted in FIG. 27, first, the moving body 100 recognizes a gesture of the user 10 riding the moving body 100 (S721). For example, the moving body 100 may recognize a motion of a hand (i.e., a gesture) of the user 10 according to images captured by the image-capturing apparatus included in the sensor section 153.

Next, the moving body 100 determines from the recognized gesture whether or not the user 10 is trying to interact with the subject object 30 that is present in the external environment (e.g., whether or not the user 10 is reaching for the subject object 30) (S722). In a case where it is determined that the user 10 is not trying to interact with the subject object 30 (S722/No), the moving body 100 returns to Step S721 to perform gesture recognition of the user 10 riding the moving body 100, again.

In a case where the user 10 is trying to interact with the subject object 30 (S722/Yes), the moving body 100 identifies the subject object 30 and the position of the subject object 30 (S723). For example, the moving body 100 may identify the subject object 30 with which the user 10 is trying to interact, and identify the position of the subject object 30, according to images captured by the image-capturing apparatus included in the sensor section 153.

Next, the moving body 100 creates a movement plan for moving to a position where the user 10 can interact with the identified subject object 30 (e.g., the user 10 can reach the subject object 30 with her/his hand) (S724). Then, after automatically travelling in accordance with the created movement plan (S725), the moving body 100 adjusts the seat surface height of the body 150 to a height at which the user 10 can interact with the subject object 30 (e.g., the user 10 can reach the subject object 30 with her/his hand) (S726).

Thereafter, the moving body 100 determines whether or not the user 10 riding the moving body 100 can interact with the subject object 30 (S727). In a case where the user 10 cannot interact with the subject object 30 (S727/No), the moving body 100 returns to Step S724 to create a movement plan again. On the other hand, in a case where the user 10 can interact with the subject object 30 (S727/Yes), the moving body 100 ends the action.

According to the actions mentioned above, the moving body 100 can allow the user 10 riding the moving body 100 to more efficiently interact with the subject object 30 that is present in the external environment. Accordingly, the moving body 100 can enhance convenience for the user 10.

3. Modification Examples

Figure 28:
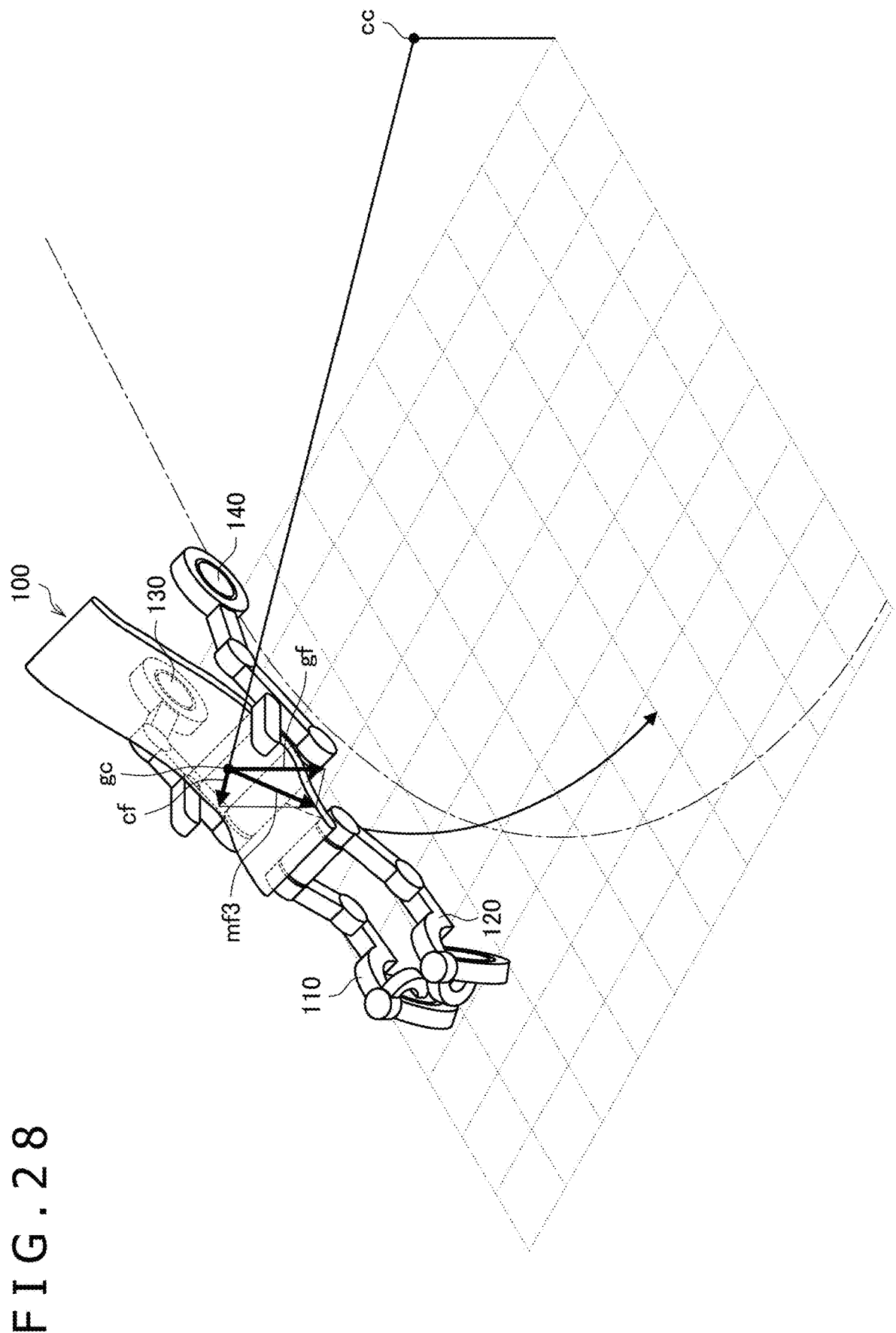
FIG. 28 is a figure for explaining a first modification example of the moving body according to the embodiment.
Figure 29:
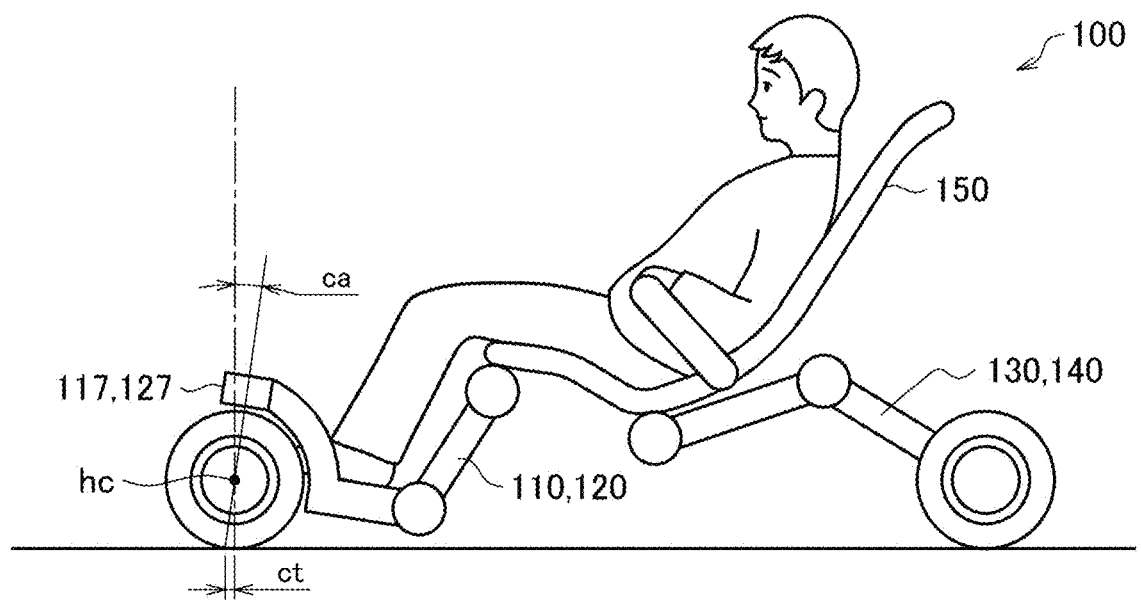
FIG. 29 is a figure for explaining a second modification example of the moving body according to the embodiment.

Further, modification examples of the moving body 100 according to the present embodiment are explained with reference to FIG. 28 and FIG. 29. FIG. 28 is a figure for explaining a first modification example of the moving body 100 according to the present embodiment. FIG. 29 is a figure for explaining a second modification example of the moving body 100 according to the present embodiment.

First Modification Example

The first modification example is a modification example in which the moving body 100 in the four-wheel travel mode dynamically controls the suspension of the body 150.

For example, the moving body 100 can control each of the front wheel legs 110 and 120 and the rear wheel legs 130 and 140 along two or more axes. Accordingly, the moving body 100 can further reduce vibrations of the body 150 by controlling the vertical position of each wheel according to changes of a load applied to each of the wheels of the front wheel legs 110 and 120 and the wheels of the rear wheel legs 130 and 140. In particular, in a case where the moving body 100 travels on a non-flat uneven ground, the moving body 100 can travel smoothly on the uneven ground by controlling the vertical position of each wheel.

The load applied to each of the wheels of the front wheel legs 110 and 120 and the wheels of the rear wheel legs 130 and 140 may be acquired from a load sensor provided to the wheel, may be estimated from load fluctuations of each joint of the wheel, or may be estimated from the condition of slipping or spinning of the wheel. Moreover, the load applied to each of the wheels of the front wheel legs 110 and 120 and the wheels of the rear wheel legs 130 and 140 may be estimated according to the three-dimensional shape of a sensed travel surface.

In addition, as depicted in FIG. 28, when the moving body 100 makes a turn, the moving body 100 can also control the front wheel leg 120 and the rear wheel leg 140 as inner wheels such that they are positioned lower, and control the front wheel leg 110 and the rear wheel leg 130 as outer wheels such that they are positioned higher. In such a case, it becomes possible for the moving body 100 to control the bank angle of the body 150. As a result, the moving body 100 can prevent itself from falling sideways at a time when it makes a turn since it is possible to perform control such that a resultant force vector mf3 of a centrifugal force cf and the gravitational force gf acting on the center of mass of the moving body 100 intersects the inner side of a support polygon linking the ground-contacting points of the front wheel legs 110 and 120 and rear wheel legs 130 and 140.

For example, the bank angle of the body 150 of the moving body 100 may be calculated in reference to the speed of the moving body 100, the distance from a turning center cc (i.e., the turning radius), the weight of the moving body 100 (also including a user riding the body 150), and the like. In addition, the bank angle of the body 150 of the moving body 100 may be calculated such that a load applied to each of the wheels of the front wheel legs 110 and 120 and the wheels of the rear wheel legs 130 and 140 become uniform with each other.

Second Modification Example

The second modification example is a modification example in which the moving body 100 in the four-wheel travel mode controls the caster angle of the steering sections 117 and 127 provided to the front wheel legs 110 and 120.

For example, the moving body 100 may control the postures of the front wheel legs 110 and 120 such that a swing axis of the steering sections 117 and 127 relative to the wheels 116 and 126 inclines by a caster angle ca relative to a direction perpendicular to the ground-contacting surface.

In a case where the caster angle ca increases, a distance (i.e., caster trail) ct between the ground-contacting points of the wheels 116 and 126 and an intersection between the ground-contacting surface and the swing axis of the steering sections 117 and 127 passing through a rotation center hc of the wheels 116 and 126 increases. In such a case, the moving body 100 can further enhance the stability at a time of travelling straight. On the other hand, in a case where the caster angle ca decreases, the distance (i.e., caster trail) ct between the ground-contacting points of the wheels 116 and 126 and the intersection between the ground-contacting surface and the swing axis of the steering sections 117 and 127 passing through the rotation center hc of the wheels 116 and 126 decreases. In such a case, the moving body 100 can further enhance the performance of making a turn at a time of travelling.

Accordingly, the moving body 100 can dynamically optimize the travel performance of the moving body 100 in the four-wheel travel mode by controlling the postures of the front wheel legs 110 and 120 according to the movement speed and turning radius to control the caster angle of the steering sections 117 and 127. Therefore, the moving body 100 can perform more stable travelling in the four-wheel travel mode.

4. Notes

Whereas a suitable embodiment of the present disclosure has been explained in detail with reference to the attached figures thus far, the technical scope of the present disclosure is not limited to the example. Obviously, it is possible for those with ordinary knowledge in the technical field of the present disclosure to conceive of various types of modification examples or corrected examples within the scope of the technical idea described in the claims, and those various types of modification examples or corrected examples are understood as certainly belonging to the technical scope of the present disclosure.

In addition, the advantages described in the present specification are presented merely for explanation or illustration, and not for limitation. That is, the technology according to the present disclosure can exhibit other advantages that are obvious for those skilled in the art from the description of the present specification, along with the advantages described above or in place of the advantages described above.

Note that the following configurations also fall within the technical scope of the present disclosure.

(1)

A moving body including:

four or more legs that have wheels at ends thereof, and are able to be controlled along two or more axes; and a body supported at the four or more legs, in which the four or more legs include two or more front wheel legs that are capable of swinging forward in an advancing direction of the body and two or more rear wheel legs that are capable of swinging backward in the advancing direction of the body, and the front wheel legs and the rear wheel legs are capable of swinging to such positions that the wheels overlap one another in a direction orthogonal to the advancing direction.

(2)

The moving body according to (1) above, in which the body includes a seat that allows a user to ride thereon.

(3)

The moving body according to (1) or (2) above, in which each of the four or more legs includes a link mechanism having two or more joints.

(4)

The moving body according to any one of (1) through (3) above, in which the front wheel legs include steering sections that control directions of the wheels relative to the advancing direction.

(5)

The moving body according to any one of (1) through (4) above, in which the wheels are driven by in-wheel motors.

(6)

The moving body according to any one of (1) through (5) above, in which ground-contacting positions of the front wheel legs and the rear wheel legs are controlled according to an inclination of the body in the advancing direction.

(7)

The moving body according to (6) above, in which the ground-contacting positions of the front wheel legs and the rear wheel legs are controlled such that a point at which a resultant force vector of an acceleration reaction force of the moving body and gravitational force applied to a center of mass of the moving body intersects a travel surface is located between the ground-contacting positions of the front wheel legs and the ground-contacting positions of the rear wheel legs in the advancing direction.

(8)

The moving body according to any one of (1) through (7) above, in which the moving body travels in a posture in which the front wheel legs are stretched forward and the rear wheel legs are stretched backward.

(9)

The moving body according to any one of (1) through (8) above, in which the moving body travels in a posture in which the wheels of the front wheel legs and the rear wheel legs overlap one another in the direction orthogonal to the advancing direction.

(10)

The moving body according to any one of (1) through (9) above, in which the two or more front wheel legs are controlled such that the wheels become parallel to each other in the direction orthogonal to the advancing direction, and the two or more rear wheel legs are controlled such that the wheels become parallel to each other in the direction orthogonal to the advancing direction.

(11)

The moving body according to any one of (1) through (10) above, further including:
a sensor section that acquires information regarding an external environment.

(12)

The moving body according to (11) above, in which the four or more legs control a height of the body in reference to the information regarding the external environment.

(13)

The moving body according to (11) or (12) above, in which the four or more legs control movement of the moving body in reference to the information regarding the external environment.

(14)

The moving body according to any one of (11) through (13) above, in which the information regarding the external environment includes information regarding a gesture of a user who is riding the moving body.

(15)

The moving body according to any one of (11) through (14) above, in which the information regarding the external environment includes information regarding a recognition result concerning a human who is present in the external environment.

(16)

A control apparatus, in which
the control apparatus controls a moving body including four or more legs that have wheels at ends thereof and are able to be controlled along two or more axes, and a body supported at the four or more legs, and
the control apparatus swings two or more front wheel legs out of the four or more legs that are capable of swinging forward in an advancing direction of the body and two or more rear wheel legs out of the four or more legs that are capable of swinging backward in the advancing direction of the body to such positions that the wheels overlap one another in a direction orthogonal to the advancing direction.

REFERENCE SIGNS LIST

10: User
20: Second person
30: Subject object
100: Moving body
110, 120: Front wheel leg
111, 121, 131, 141: First joint
112, 122, 132, 142: First link
113, 123, 133, 143: Second joint
114, 124, 134, 144: Second link
115, 125, 135, 145: Drive section
116, 126, 136, 146: Wheel
117, 127: Steering section
130, 140: Rear wheel leg
150: Body
151: Control section
152: Input section
153: Sensor section
154: Power source section
160: Motor section
200: Step

The invention claimed is:

1. A moving body comprising:
four or more legs that have wheels at ends thereof, and are able to be controlled along two or more axes;
a body supported at the four or more legs, wherein the four or more legs include two or more front wheel legs that are capable of swinging forward in an advancing direction of the body and two or more rear wheel legs that are capable of swinging backward in the advancing direction of the body, and the front wheel legs and the rear wheel legs are capable of swinging to such positions that the wheels overlap one another in a direction orthogonal to the advancing direction, and
wherein the moving body is capable of transforming into one or more postures by controlling postures of the front wheel legs and the rear wheel legs, wherein one said posture is a posture in which the wheels of the front wheel legs and the rear wheel legs overlap one another in the direction orthogonal to the advancing direction, and wherein the posture of the moving body is controlled to be in a stabilized state by performing inverted pendulum control using the two wheels of the front wheel legs, the two wheels of the rear wheel legs, or both the two wheels of the front wheel legs and the two wheels of the rear wheel legs.

2. The moving body according to claim 1, wherein the body includes a seat that allows a user to ride thereon.

3. The moving body according to claim 1, wherein each of the four or more legs includes a link mechanism having two or more joints.

4. The moving body according to claim 1, wherein the front wheel legs include steering sections that control directions of the wheels relative to the advancing direction.

5. The moving body according to claim 1, wherein the wheels are driven by in-wheel motors.

6. The moving body according to claim 1, wherein ground-contacting positions of the front wheel legs and the rear wheel legs are controlled according to an inclination of the body in the advancing direction.

7. The moving body according to claim 6, wherein the ground-contacting positions of the front wheel legs and the rear wheel legs are controlled such that a point at which a resultant force vector of an acceleration reaction force of the moving body and gravitational force applied to a center of mass of the moving body intersects a travel surface is located between the ground-contacting positions of the front wheel legs and the ground-contacting positions of the rear wheel legs in the advancing direction.

8. The moving body according to claim 1, wherein the moving body travels in a posture in which the front wheel legs are stretched forward and the rear wheel legs are stretched backward.

9. The moving body according to claim 1, further comprising:
a sensor section that acquires information regarding an external environment.

10. The moving body according to claim 9, wherein the four or more legs control a height of the body in reference to the information regarding the external environment.

11. The moving body according to claim 9, wherein the four or more legs control movement of the moving body in reference to the information regarding the external environment.

12. The moving body according to claim 9, wherein the information regarding the external environment includes information regarding a gesture of a user who is riding the moving body.

13. The moving body according to claim 9, wherein the information regarding the external environment includes information regarding a recognition result concerning a human who is present in the external environment.

14. The moving body according to claim 1, wherein the advancing direction of the moving body is controlled by differential control of the left and right wheels of the front wheel legs and/or the left and right wheels of the rear wheel legs.

15. The moving body according to claim 1, wherein the moving body is capable of transforming between the posture and a posture in which the front wheel legs are stretched forward and the rear wheel legs are stretched backward.

16. The moving body according to claim 1, wherein the moving body is capable of transforming between the posture and a posture in which the wheels of the front wheel legs and the rear wheel legs are at positions with which the wheelbase length becomes approximately the same as the footprint of the body.

17. The moving body according to claim 1, wherein the moving body is capable of transforming into the posture when the moving body determines that the space between the wheels of the front wheel legs and the wheels of the rear wheel legs is equal to or narrower than a threshold, wherein the threshold is a threshold of space between the wheels of the front wheel legs and the wheels of the rear wheel legs that four-wheel inverted pendulum control can be performed with the wheels of the front wheel legs and the wheels of the rear wheel legs.

18. The moving body according to claim 1, wherein the moving body determines whether there is a space between the wheels of the front wheel legs and the wheels of the rear wheel legs, wherein in a case where there is a space between the wheels of the front wheel legs and the wheels of the rear wheel legs, the moving body narrows the space between the wheels of the front wheel legs and the wheels of the rear wheel legs.

19. The moving body according to claim 1, wherein the moving body uses four-wheel inverted pendulum control to perform level ground travel control and uses two-wheel inverted pendulum control to perform ascending/descending control.

20. A control apparatus, wherein
the control apparatus controls a moving body including four or more legs that have wheels at ends thereof and are able to be controlled along two or more axes, and a body supported at the four or more legs,
the control apparatus swings two or more front wheel legs out of the four or more legs that are capable of swinging forward in an advancing direction of the body and two or more rear wheel legs out of the four or more legs that are capable of swinging backward in the advancing direction of the body to such positions that the wheels overlap one another in a direction orthogonal to the advancing direction, and
wherein the control apparatus transforms the moving body into one or more postures by controlling postures of the front wheel legs and the rear wheel legs, wherein one said posture is a posture in which the wheels of the front wheel legs and the rear wheel legs overlap one another in the direction orthogonal to the advancing direction, and wherein the posture of the moving body can be controlled to be in a stabilized state by performing inverted pendulum control using the two wheels of the front wheel legs, the two wheels of the rear wheel legs, or both the two wheels of the front wheel legs and the two wheels of the rear wheel legs.

\* \* \* \* \*